(12) United States Patent
Jiang et al.

(10) Patent No.: US 11,201,709 B2
(45) Date of Patent: Dec. 14, 2021

(54) METHOD AND APPARATUS FOR DETERMINING AND TRANSMITTING PARAMETER OF REFERENCE SIGNAL, TERMINAL DEVICE AND BASE STATION

(71) Applicant: ZTE Corporation, Guangdong (CN)

(72) Inventors: Chuangxin Jiang, Guangdong (CN); Zhaohua Lu, Guangdong (CN); Yu Ngok Li, Guangdong (CN); Hao Wu, Guangdong (CN); Bo Gao, Guangdong (CN); Nan Zhang, Guangdong (CN)

(73) Assignee: ZTE CORPORATION, Shenzhen (CN)

( * ) Notice: Subject to any disclaimer, the term of this patent is extended or adjusted under 35 U.S.C. 154(b) by 142 days.

(21) Appl. No.: 16/503,508

(22) Filed: Jul. 4, 2019

(65) Prior Publication Data
US 2019/0327058 A1 Oct. 24, 2019

Related U.S. Application Data

(63) Continuation of application No. PCT/CN2017/120154, filed on Dec. 29, 2017.

(30) Foreign Application Priority Data

Jan. 4, 2017 (CN) .......................... 201710005576.0

(51) Int. Cl.
*H04L 5/00* (2006.01)
*H04W 76/27* (2018.01)
*H04B 7/01* (2006.01)

(52) U.S. Cl.
CPC ............. *H04L 5/0048* (2013.01); *H04B 7/01* (2013.01); *H04L 5/0007* (2013.01); *H04W 76/27* (2018.02)

(58) Field of Classification Search
CPC ... H04L 5/0016; H04L 5/0021; H04L 5/0048; H04L 5/0091; H04L 5/0094;
(Continued)

(56) References Cited

U.S. PATENT DOCUMENTS

2012/0014320 A1* 1/2012 Nam ..................... H04L 5/0016
370/328
2012/0176885 A1 7/2012 Lee et al.
(Continued)

FOREIGN PATENT DOCUMENTS

CN 102045149 A 5/2011
CN 102217348 A 10/2011
(Continued)

OTHER PUBLICATIONS

Australian Examination Report dated Jun. 29, 2020 for Australian Patent Application No. 2017390809, filed on Dec. 29, 2017 (7 pages).
(Continued)

*Primary Examiner* — Michael Thier
*Assistant Examiner* — Prince A Mensah
(74) *Attorney, Agent, or Firm* — Perkins Coie LLP

(57) ABSTRACT

The embodiments of the present disclosure disclose a method for determining a parameter of a reference signal, a method for transmitting a parameter of a reference signal, a terminal device and a base station. The determination method includes: obtaining a parameter of a first type of reference signal by a first signaling; and determining a parameter of a second type of reference signal according to the obtained parameter of the first type of reference signal, and the first type of reference signal and/or the second type of reference signal include at least one of: reference signal for data demodulation, reference signal for phase noise
(Continued)

compensation, reference signal for Doppler shift compensation, or extended reference signal for data demodulation.

28 Claims, 10 Drawing Sheets

(58) Field of Classification Search
CPC .. H04L 5/0007; H04W 4/06; H04W 72/0413; H04W 72/0453; H04W 72/1284; H04W 76/27; H04B 7/00–02
See application file for complete search history.

(56) References Cited

U.S. PATENT DOCUMENTS

| | | | |
|---|---|---|---|
| 2013/0094411 | A1 | 4/2013 | Zhang |
| 2016/0087709 | A1 | 3/2016 | Horiuchi |
| 2016/0112171 | A1 | 4/2016 | Sorrentino et al. |
| 2016/0323895 | A1 | 11/2016 | Pourahmadi et al. |
| 2020/0059337 | A1* | 2/2020 | Yamada ................ H04L 5/0091 |
| 2020/0067661 | A1* | 2/2020 | Siomina ................ H04W 4/06 |

FOREIGN PATENT DOCUMENTS

| | | |
|---|---|---|
| CN | 102823208 A | 12/2012 |
| CN | 103229428 A | 7/2013 |
| CN | 103491637 A | 1/2014 |
| CN | 103974418 A | 8/2014 |
| CN | 103997722 A | 8/2014 |
| CN | 104081872 A | 10/2014 |
| CN | 104471885 A | 3/2015 |
| JP | 2011-237338 A | 11/2011 |
| JP | 2016-516328 A | 6/2016 |
| KR | 10-1407679 B1 | 6/2014 |
| RU | 2 496 118 C | 10/2013 |
| WO | 2011/028079 A2 | 3/2011 |
| WO | 2016/099978 A2 | 6/2016 |
| WO | 2016/148789 A1 | 9/2016 |

OTHER PUBLICATIONS

Canadian Office Action dated Aug. 12, 2020 for Canadian Patent Application No. 3,049,301, filed on Dec. 29, 2017 (5 pages).
Chinese Office Action dated Jun. 17, 2019 for Chinese Patent Application No. 201710005576.0, filed on Jan. 4, 2017 (19 pages).
Chinese Office Action dated Mar. 8, 2019 for Chinese Patent Application No. 201710005576.0, filed on Jan. 4, 2017 (18 pages).
Chinese Supplemental Search Report dated Oct. 24, 2019 for Chinese Patent Application No. 201710005576.0, filed on Jan. 4, 2017 (3 pages).
Decision of Patent dated Feb. 16, 2021 for Japanese Patent Application No. 2019-536525, filed on Dec. 29, 2017 (5 pages).
Ericsson, "Design consideration for phase noise tracking RS (PTRS)," 3GPP TSG-RAN WG1 #87, Reno Nevada, USA, R1-1612333, 4 pages, Nov. 2016.
Extended Search Report dated Jul. 8, 2020 for European Patent Application No. 17889722.9, filed on Dec. 29, 2017 (10pages).
Indian Examination Report dated Feb. 15, 2021 for Indian Patent Application No. 201937031359, filed on Dec. 29, 2017 (5 pages).
Intel Corporation, "On DM-RS design for NR," Discussion and Decision, 3GPP TSG RAN WG1 Meeting #87, Reno, Nevada, USA, R1-1611976, 3 pages, Nov. 2016.
Interdigital Communications, "Considerations on demodulation RS design for NR," Discussion, 3GPP TSG-RAN WG1 Meeting #86bis, Lisbon, Portugal, R1-1609909, 3 pages, Oct. 2016.
International Search Report and Written Opinion dated Mar. 20, 2018 for International Application No. PCT/CN2017/120154, filed on Dec. 29, 2017 (10 pages).
Huawei, Hisilicon, "DL DM-RS for data transmissions," Discussion and Decision, 3GPP TSG RAN WG1 Meeting #87, Reno, Nevada, USA, R1-1611244, 5 pages, Nov. 2016.
Huawei, Hisilicon, "DMRS enhancement of V2V," Discussion and Decision, 3GPP TSG RAN WG1 Meeting #84, St. Julian's, Malta, R1-160284, 11 pages, Feb. 2016.
Japanese Office Action dated Sep. 8, 2020 for Japanese Patent Application No. 2019-536525, filed on Dec. 29, 2017 (9 pages).
Korean Grant of Patent dated Mar. 16, 2021 for Korean Patent Application No. 10-2019-7022886, filed on Dec. 29, 2017 (8 pages).
Korean Office Action dated Sep. 21, 2020 for Korean Patent Application No. 10-2019-7022886, filed on Dec. 29, 2017 (10 pages).
LG Electronics, "DMRS Design Issues in NR," Discussion, 3GPP TSG RAN WG1 Meeting #86bis, Lisbon, Portugal, R1-1609259, 8 pages, Oct. 2016.
NTT Docomo, "Discussion on High Order MU-MIMO Transmission for NR," Discussion and Decision, 3GPP TSG RAN WG1 Meeting #87, Reno, Nevada, USA, R1-1612726, 6 pages, Nov. 2016.
Russian Office Action dated Dec. 5, 2019 for Russian Patent Application No. 2019124531 filed on Dec. 29, 2017 (11 pages).

* cited by examiner a b c d e

▦ the first group of the first type of reference signal
▦ the second group of the first type of reference signal
▦ the first group of the second type of reference signal
▦ the second group of the second type of reference signal ▦ the first type of reference signal
▦ the second type of reference signal a        b ▨ the first type of reference signal
▨ the first group of the second type of reference signal
▨ the second group of the second type of reference signal ▨ the first type of reference signal
▨ port 1 of the second type of reference signal
▨ port 2 of the second type of reference signal

METHOD AND APPARATUS FOR DETERMINING AND TRANSMITTING PARAMETER OF REFERENCE SIGNAL, TERMINAL DEVICE AND BASE STATION

CROSS REFERENCE TO RELATED APPLICATIONS

This patent document is a continuation of and claims priority to International Patent Application No. PCT/CN2017/120154, filed on Dec. 29, 2017, which claims the benefit of priority of Chinese Patent Application No. 201710005576.0, filed on Jan. 4, 2017. The entire contents of the before-mentioned patent applications are incorporated by reference as part of the disclosure of this application.

TECHNICAL FIELD

The present disclosure relates to the field of wireless communications, and in particular to a method and apparatus for determining and transmitting a parameter of a reference signal, a terminal device and a base station.

BACKGROUND

At present, the physical layer technology of New Radio (NR) is under the hot discussion of 3GPP RAN1. It has always been a goal to design more flexible and efficient NR physical layers. The use of high frequency bands in NR is one of important points, and in order to compensate for the path loss in the high frequency bands, the multiple-antenna beamforming scheme seems to be an indispensable solution. In the multiple-antenna beamforming scheme, a base station transmits a very narrow beam using multiple antennas to obtain a beamforming gain. In this way, transmissions in different layers for different users or for a same user are relatively independent, and thus the research on multi-user multiplexing becomes an important point.

The design of a demodulation reference signal affects demodulation of data to a large extent. In Long Term Evolution (LTE), at most four Demodulation Reference Signal (DMRS) ports can be orthogonally multiplexed for downlink. That is to say, at the time of multi-user scheduling, only ports of at most 4 users are orthogonal to each other. In NR, it is imperative under the situation to increase the number of orthogonal multi-user ports.

In the NR, the 3GPP conference has agreed to design a DMRS pattern having a flexible time-frequency-domain density, and a pattern called "front loaded" has been agreed to be adopted. In the front loaded scheme, if only one column of demodulation reference signals are available, it is a problem how to multiplex at most 8 orthogonal ports. In order to achieve flexibility and orthogonality of multi-user, all details and signaling notification must be further studied.

In addition, because the center carrier frequency used in the high frequency bands is very high, phase noise becomes a big problem. It is worth studying how to design the reference signal to effectively estimate the phase noise and how to reduce the signaling notification.

For the above technical problems in the related art, no effective solution has been proposed yet.

SUMMARY

The embodiments of the present disclosure provide a method and apparatus for determining and transmitting a parameter of a reference signal, a terminal device and a base station, so as to at least solve the problem in the related art that the signaling overhead required in obtaining the reference signal is large.

According to an embodiment of the present disclosure, a method for determining a parameter of a reference signal includes: obtaining a parameter of a first type of reference signal by using first signaling; and determining a parameter of a second type of reference signal according to the obtained parameter of the first type of reference signal, the first type of reference signal and/or the second type of reference signal including at least one of: reference signal for data demodulation, reference signal for phase noise compensation, reference signal for Doppler shift compensation, or extended reference signal for data demodulation.

In an embodiment, the operation of determining the parameter of the second type of reference signal according to the obtained parameter of the first type of reference signal may include: directly determining the parameter of the second type of reference signal according to the parameter of the first type of reference signal; or, determining, according to the parameter of the first type of reference signal and a first specified parameter of the second type of reference signal, a second specified parameter of the second type of reference signal, the first specified parameter being the same as or different from the second specified parameter.

In an embodiment, before the operation of determining the second specified parameter of the second type of reference signal according to the parameter of the first type of reference signal and the first specified parameter of the second type of reference signal, the method may further include an operation of: obtaining the first specified parameter of the second type of reference signal by a second signaling.

In an embodiment, the parameter of the first type of reference signal may include at least one of: a pattern of the first type of reference signal, a number of ports of the first type of reference signal, port number(s) of the first type of reference signal, a length of orthogonal code(s) used by the first type of reference signal, orthogonal code sequence(s) used by the first type of reference signal, index or indices of the orthogonal code sequence(s) used by the first type of reference signal, a transmission resource used by the first type of reference signal, parameter(s) used for generating a sequence for the first type of reference signal, a manner in which a sequence is generated for the first type of reference signal, a sequence type used by the first type of reference signal, a waveform used by the first type of reference signal, or a transmission mode used by the first type of reference signal; the parameter of the second type of reference signal includes at least one of: a pattern of the second type of reference signal, a number of ports of the second type of reference signal, port number(s) of the second type of reference signal, a length of orthogonal code used by the second type of reference signal, orthogonal code sequence(s) used by the second type of reference signal, index or indices of the orthogonal code sequence(s) used by the second type of reference signal, a transmission resource used by the second type of reference signal, parameter(s) used for generating a sequence for the second type of reference signal, a manner in which a sequence is generated for the second type of reference signal, a sequence type used by the second type of reference signal, a waveform used by the second type of reference signal, or a transmission mode used by the second type of reference signal.

In an embodiment, the ports of the second type of reference signal may be divided into multiple port groups, and the multiple port groups are distinguished in a time division manner.

In an embodiment, transmission resources used by different ports of the second type of reference signal may be completely different or partially different.

In an embodiment, in the case that the parameter of the first type of reference signal is the transmission resource used by the first type of reference signal, the parameter of the second type of reference signal and/or the second specified parameter is the transmission resource used by the second type of reference signal, and the first specified parameter is a position where the second type of reference signal are located in the transmission resource, and the transmission resource includes at least one of: transmission bandwidth, transmission location, time-domain density, or frequency-domain density.

In an embodiment, in the case that the number of ports of the second type of reference signal is smaller than the number of ports of the first type of reference signal, a transmission mode in which the second type of reference signal are transmitted is a transmission mode obtained by performing a predetermined operation on a transmission mode of a predetermined number of ports of the first type of reference signal.

In an embodiment, in the case that the parameter of the first type of reference signal is an orthogonal sequence of the first type of reference signal, the parameter of the second type of reference signal and/or the second specified parameter is a subsequence of an orthogonal sequence of the first type of reference signal, and the first specified parameter is a length of the orthogonal sequence of the second type of reference signal.

In an embodiment, the subsequences of the orthogonal sequences corresponding to multiple ports of the first type of reference signal are the same.

In an embodiment, in the case that the parameter of the first type of reference signal is a pattern of the first type of reference signal, the parameter of the second type of reference signal and/or the second specified parameter is a pattern of the second type of reference signal, and the specified parameter indicates the length of the orthogonal sequences of the second type of reference signal.

In an embodiment, in the case that the parameter of the first type of reference signal is at least one of: the pattern, the number of ports, the port sequence(s), the length of the orthogonal sequence, or the orthogonal sequence, the parameter of the second type of reference signal and/or the second specified parameter is at least one of: the pattern, the number of ports, the port sequence, the length of the orthogonal sequence, or the orthogonal sequence, and the first specified parameter is a maximum number of ports of the second type of reference signal, and the maximum number of ports of the second type of reference signal is notified by a high layer signaling.

In an embodiment, multiple ports of the first type of reference signal use different orthogonal sequences and the same pseudo-random sequence; and multiple ports of the second type of reference signal use the same orthogonal sequence and different pseudo-random sequences.

In an embodiment, before the determining the parameter of the second type of reference signal according to the obtained parameter of the first type of reference signal, the method may further include: obtaining an association between the parameter of the first type of reference signal and the parameter of the second type of reference signal, and the operation of determining the parameter of the second type of reference signal according to the obtained parameter of the first type of reference signal includes: determining the parameter of the second type of reference signal according to the parameter of the first type of reference signal and the association.

In an embodiment, the method may further include an operation of: determining whether to transmit the second type of reference signal according to whether the time-domain orthogonal sequences of the first type of reference signal are applied; or determining whether the time-domain orthogonal sequences of the first type of reference signal are applied according to a determination whether the second type of reference signal are transmitted.

In an embodiment, when the parameter of the first type of reference signal is a number L1 of ports, the operation of determining the parameter of the second type of reference signal according to the obtained parameter of the first type of reference signal may include an operation of:

dividing the L1 ports into L2 groups, and the ports of the first type of reference signal within each of the L2 groups corresponding to the same port of the second type of reference signal, where L1 and L2 are positive integers.

In an embodiment, the sequence of the second type of reference signal may be determined from a sequence of the first type of reference signal at a corresponding frequency-domain location.

In an embodiment, the sequence of the second type of reference signal may be a replicated sequence of the sequence of the first type of reference signal at a corresponding frequency-domain resource element.

In an embodiment, the method may further include: obtaining, in a predefined manner or in a high layer signaling configuration manner, a location of a transmission resource block for the second type of reference signal in each sub-band, each sub-band including multiple transmission resource blocks, and division lengths of the sub-band being the same or different for different users.

According to an embodiment of the present disclosure, a method is provided for transmitting a parameter of a reference signal. The method includes: configuring a parameter of the first type of reference signal; transmitting, by a first signaling, the configured parameter of the first type of reference signal to a terminal device, the parameter of the first type of reference signal being used to determine a parameter of the second type of reference signal, and the first type of reference signal and/or the second type of reference signal including at least one of: reference signal for data demodulation, reference signal for phase noise compensation, reference signal for Doppler shift compensation, or extended reference signal for data demodulation.

In an embodiment, the parameter of the second type of reference signal may be determined by at least one of the following ways: determining the parameter of the second type of reference signal directly from the parameter of the first type of reference signal; or determining the parameter of the second type of reference signal jointly from the parameter of the first type of reference signal and the first specified parameter of the second type of reference signal.

In an embodiment, the method further may further include an operation of: transmitting, by a second signaling, the first specified parameter of the second type of reference signal to the terminal device.

In an embodiment, the parameter of the first type of reference signal includes at least one of: a pattern of the first type of reference signal, a number of ports of the first type of reference signal, a port number of the first type of reference signal, a length of orthogonal code used by the first type of reference signal, an orthogonal code sequence used by the first type of reference signal, an index of the orthogonal code sequence used by the first type of reference signal, a transmission resource used by the first type of reference signal, a parameter used for generating a sequence for the first type of reference signal, a manner in which a sequence is generated for the first type of reference signal, a sequence type used by the first type of reference signal, a waveform used by the first type of reference signal, or a transmission mode used by the first type of reference signal. The parameter of the second type of reference signal includes at least one of: a pattern of the second type of reference signal, a number of ports of the second type of reference signal, a port number of the second type of reference signal, a length of orthogonal code used by the second type of reference signal, an orthogonal code sequence used by the second type of reference signal, an index of the orthogonal code sequence used by the second type of reference signal, a transmission resource used by the second type of reference signal, a parameter used for generating a sequence for the second type of reference signal, a manner in which a sequence is generated for the second type of reference signal, a sequence type used by the second type of reference signal, a waveform used by the second type of reference signal or a transmission mode used by the second type of reference signal.

In an embodiment, the ports of the second type of reference signal may be divided into multiple port groups, and the multiple port groups are distinguished in a time division manner.

In an embodiment, transmission resources used by different ports of the second type of reference signal may be completely different or partially different.

In an embodiment, in the case that the parameter of the first type of reference signal is a transmission resource used by the first type of reference signal, a parameter of the second type of reference signal is a transmission resource used by the second type of reference signal, and the first specified parameter is a position where the second type of reference signal are located in the transmission resource, and the transmission resource includes at least one of: transmission bandwidth, transmission location, time-domain density or frequency-domain density.

In an embodiment, in the case that the number of ports of the second type of reference signal is smaller than the number of ports of the first type of reference signal, a transmission mode in which the second type of reference signal are transmitted is a transmission mode obtained by performing a predetermined operation on a transmission mode of a predetermined number of ports of the first type of reference signal.

In an embodiment, in the case that the parameter of the first type of reference signal is an orthogonal sequence of the first type of reference signal, the parameter of the second type of reference signal is a subsequence of the orthogonal sequence of the first type of reference signal, and the first specified parameter is the length of the orthogonal sequences of the second type of reference signal.

In an embodiment, the subsequences of the orthogonal sequences corresponding to the multiple ports of the first type of reference signal are the same.

In an embodiment, in the case that the parameter of the first type of reference signal is a pattern of the first type of reference signal, the parameter of the second type of reference signal and/or the second specified parameter is a pattern of the second type of reference signal, and the first specified parameter is the length of the orthogonal sequences of the second type of reference signal.

In an embodiment, in the case that the parameter of the first type of reference signal is at least one of: the pattern, the number of ports, the port sequence, the length of the orthogonal sequence, or the orthogonal sequence, the parameter of the second type of reference signal and/or the second specified parameter is at least one of: the pattern, the number of ports, the port sequence, a length of the orthogonal sequence, or the orthogonal sequence, and the first specified parameter is a maximum number of ports of the second type of reference signal, and the maximum number of ports of the second type of reference signal is notified by a high layer signaling.

In an embodiment, multiple ports of the first type of reference signal use different orthogonal sequences and the same pseudo-random sequence; multiple ports of the second type of reference signal use the same orthogonal sequence and different pseudo-random sequences.

In an embodiment, before the transmitting the obtained parameter of the first type of reference signal to the terminal device by the first signaling, the method may further include: receiving indication information fed back from the terminal device and for indicating an association between the parameter of the first type of reference signal and the parameter of the second type of reference signal; and configuring, according to the indication information, the association between the parameter of the first type of reference signal and the parameter of the second type of reference signal.

In an embodiment, the indication information may include at least one of: a port association between the first type of reference signal and the second type of reference signal, or a number of ports of the second type of reference signal.

In an embodiment, the method may further include an operation of: configuring application of the time-domain orthogonal sequence of the first type of reference signal or configuring transmission of the second type of reference signal.

In an embodiment, when the parameter of the first type of reference signal is a number L1 of ports, the operation of determining manner of the parameter of the second type of reference signal may include: dividing the L1 ports into L2 groups, the ports of the first type of reference signal of each group in the L2 groups corresponding to the same port of the second type of reference signal, and where L1 and L2 are positive integers.

In an embodiment, the sequence of the second type of reference signal may be determined from a sequence of the first type of reference signal at a corresponding frequency-domain location.

In an embodiment, the sequence of the second type of reference signal may be a replicated sequence of the sequence of the first type of reference signal at a corresponding frequency-domain resource element.

In an embodiment, the method may further include: configuring a position of transmission resource block for the second type of reference signal in each sub-band in a predefined manner or in a high layer signaling manner, each sub-band including multiple transmission resource blocks, and division lengths of the sub-band are the same or different for different users.

According to an embodiment of the present disclosure, an apparatus is provided for determining a parameter of reference signal, which includes: an obtaining module, configured to obtain, by a first signaling, a parameter of a first type of reference signal; a determining module, configured to determine a parameter of a second type of reference signal according to the obtained parameter of the first type of reference signal, and the first type of reference signal and/or the second type of reference signal include(s) at least one of: reference signal for data demodulation, reference signal for phase noise compensation, reference signal for Doppler shift compensation, or extended reference signal for data demodulation.

In an embodiment, the determining module may be further configured to: directly determine the parameter of the second type of reference signal according to the parameter of the first type of reference signal; or determine, according to the parameter of the first type of reference signal and a first specified parameter of the second type of reference signal, a second specified parameter of the second type of reference signal, and the first specified parameter is the same as or different from the second specified parameter.

In an embodiment, the obtaining module may be further configured to obtain the first specified parameter of the second type of reference signal by a second signaling.

In an embodiment, the parameter of the first type of reference signal may include at least one of: a pattern of the first type of reference signal, a number of ports of the first type of reference signal, a port number of the first type of reference signal, a length of orthogonal code used by the first type of reference signal, an orthogonal code sequence used by the first type of reference signal, an index of the orthogonal code sequence used by the first type of reference signal, a transmission resource used by the first type of reference signal, a parameter used for generating a sequence for the first type of reference signal, a manner in which a sequence is generated for the first type of reference signal, a sequence type used by the first type of reference signal, a waveform used by the first type of reference signal, or a transmission mode used by the first type of reference signal. The parameter of the second type of reference signal includes at least one of: a pattern of the second type of reference signal, a number of ports of the second type of reference signal, a port number of the second type of reference signal, a length of orthogonal code used by the second type of reference signal, an orthogonal code sequence used by the second type of reference signal, an index of the orthogonal code sequence used by the second type of reference signal, a transmission resource used by the second type of reference signal, a parameter used for generating a sequence for the second type of reference signal, a manner in which a sequence is generated for the second type of reference signal, a sequence type used by the second type of reference signal, a waveform used by the second type of reference signal or a transmission mode used by the second type of reference signal.

According to an embodiment of the present disclosure, an apparatus is provided for transmitting a parameter of a reference signal, which includes: a configuration module, configured to configure a parameter of a first type of reference signal; a transmitting module, configured to transmit the configured parameter of the first type of reference signal to a terminal device by a first signaling, and the parameter of the first type of reference signal is used to determine a parameter of the second type of reference signal, and the first type of reference signal and/or the second type of reference signal include(s) at least one of: reference signal for data demodulation, reference signal for phase noise compensation, reference signal for Doppler shift compensation, or extended reference signal for data demodulation.

In an embodiment, the parameter of the second type of reference signal may be determined by at least one of: determining the parameter of the second type of reference signal directly from the parameter of the first type of reference signal; or determining the parameter of the second type of reference signal jointly from the parameter of the first type of reference signal and the first specified parameter of the second type of reference signal.

In an embodiment, the transmitting module may be further configured to transmit the first specified parameter of the second type of reference signal to the terminal device by a second signaling.

In an embodiment, the parameter of the first type of reference signal may include at least one of: a pattern of the first type of reference signal, a number of ports of the first type of reference signal, a port number of the first type of reference signal, a length of orthogonal code used by the first type of reference signal, an orthogonal code sequence used by the first type of reference signal, an index of the orthogonal code sequence used by the first type of reference signal, a transmission resource used by the first type of reference signal, a parameter used when the first type of reference signal generate a sequence, a manner in which a sequence is generated for the first type of reference signal, a sequence type used by the first type of reference signal, a waveform used by the first type of reference signal, or a transmission mode used by the first type of reference signal. The parameter of the second type of reference signal includes at least one of: a pattern of the second type of reference signal, a number of ports of the second type of reference signal, a port number of the second type of reference signal, a length of orthogonal code used by the second type of reference signal, an orthogonal code sequence used by the second type of reference signal, an index of the orthogonal code sequence used by the second type of reference signal, a transmission resource used by the second type of reference signal, a parameter used for generating a sequence for the second type of reference signal, a manner in which a sequence is generated for the second type of reference signal, a sequence type used by the second type of reference signal, a waveform used by the second type of reference signal or a transmission mode used by the second type of reference signal.

According to an embodiment of the present disclosure, a terminal device is provided that includes: a radio frequency module, configured to obtain a parameter of a first type of reference signal by a first signaling; a processor, configured to determine a parameter of a second type of reference signal according to the obtained parameter of the first type of reference signal, and the first type of reference signal and/or the second type of reference signal include(s) at least one of: reference signal for data demodulation, reference signal for phase noise compensation, reference signal for Doppler shift compensation, or extended reference signal for data demodulation.

In an embodiment, the processor may be further configured to: directly determine the parameter of the second type of reference signal according to the parameter of the first type of reference signal; or determine, according to the parameter of the first type of reference signal and a first specified parameter of the second type of reference signal, a second specified parameter of the second type of reference signal, the first specified parameter being the same as or different from the second specified parameter.

In an embodiment, the radio frequency module may be further configured to obtain the first specified parameter of the second type of reference signal by the second signaling.

In an embodiment, the parameter of the first type of reference signal may include at least one of: a pattern of the first type of reference signal, a number of ports of the first type of reference signal, a port number of the first type of reference signal, a length of orthogonal code used by the first type of reference signal, an orthogonal code sequence used by the first type of reference signal, an index of the orthogonal code sequence used by the first type of reference signal, a transmission resource used by the first type of reference signal, a parameter used for generating a sequence for the first type of reference signal, a manner in which a sequence is generated for the first type of reference signal, a sequence type used by the first type of reference signal, a waveform used by the first type of reference signal, or a transmission mode used by the first type of reference signal. The parameter of the second type of reference signal includes at least one of: a pattern of the second type of reference signal, a number of ports of the second type of reference signal, a port number of the second type of reference signal, a length of orthogonal code used by the second type of reference signal, an orthogonal code sequence used by the second type of reference signal, an index of the orthogonal code sequence used by the second type of reference signal, a transmission resource used by the second type of reference signal, a parameter used for generating a sequence for the second type of reference signal, a manner in which a sequence is generated for the second type of reference signal, a sequence type used by the second type of reference signal, a waveform used by the second type of reference signal or a transmission mode used by the second type of reference signal.

According to an embodiment of the present disclosure, a base station is provided that includes: a processor, configured to configure a parameter of the first type of reference signal; a radio frequency module, configured to transmit the configured parameter of the first type of reference signal to the terminal device by a first signaling, and the parameter of the first type of reference signal is used to determine a parameter of the second type of reference signal, and the first type of reference signal and/or the second type of reference signal include(s) at least one of:

reference signal for data demodulation, reference signal for phase noise compensation, reference signal for Doppler shift compensation or extended reference signal for data demodulation.

In an embodiment, the parameter of the second type of reference signal may be determined by at least one of the following ways: determining the parameter of the second type of reference signal directly from the parameter of the first type of reference signal; or determining the parameter of the second type of reference signal jointly from the parameter of the first type of reference signal and the first specified parameter of the second type of reference signal.

In an embodiment, the radio frequency module may be further configured to transmit the first specified parameter of the second type of reference signal to the terminal device by a second signaling.

In an embodiment, the parameter of the first type of reference signal may include at least one of: a pattern of the first type of reference signal, a number of ports of the first type of reference signal, a port number of the first type of reference signal, a length of orthogonal code used by the first type of reference signal, an orthogonal code sequence used by the first type of reference signal, an index of the orthogonal code sequence used by the first type of reference signal, a transmission resource used by the first type of reference signal, a parameter used for generating a sequence for the first type of reference signal, a manner in which a sequence is generated for the first type of reference signal, a sequence type used by the first type of reference signal, a waveform used by the first type of reference signal, or a transmission mode used by the first type of reference signal. The parameter of the second type of reference signal includes at least one of: a pattern of the second type of reference signal, a number of ports of the second type of reference signal, a port number of the second type of reference signal, a length of orthogonal code used by the second type of reference signal, an orthogonal code sequence used by the second type of reference signal, an index of the orthogonal code sequence used by the second type of reference signal, a transmission resource used by the second type of reference signal, a parameter used for generating a sequence for the second type of reference signal, a manner in which a sequence is generated for the second type of reference signal, a sequence type used by the second type of reference signal, a waveform used by the second type of reference signal or a transmission mode used by the second type of reference signal.

According to still another embodiment of the present disclosure, there is also provided a computer storage medium having stored thereon a computer program that, when executed by a processor, causes the processor to implement the steps of the method for determining a parameter of a reference signal in the embodiments of the present disclosure; or that, when executed by the processor, causes the processor to implement the steps of the method for transmitting a parameter of a reference signal in the embodiment of the present disclosure.

According to the embodiments of the present disclosure, the parameter of the second type of reference signal can be determined by using the parameter of the first type of reference signal, the parameter of the first type of reference signal is obtained only by the first signaling, and thus the parameter of the second type of reference signal can be obtained correspondingly. Hence, it is not necessary to use additional signaling to individually transmit the parameter of the second type of reference signal, and thereby the signaling overhead is reduced. Therefore, it is possible to solve the problem of the large signaling overhead required in obtaining the reference signal in the related art.

BRIEF DESCRIPTION OF THE DRAWINGS

The drawings are intended to provide a further understanding of the present disclosure, and intended to constitute a part of the present disclosure rather than constitute unreasonable limitation to the present disclosure. In the drawing.

DETAILED DESCRIPTION

Hereinafter, the present disclosure will be described in detail with reference to the accompanying drawings. It is to be noted that the embodiments in the present application and features in the embodiments may be combined with each other without confliction.

It is to be noted that the terms "first", "second", and the like in the specification, the claims of the present disclosure and the above drawings are used to distinguish similar objects, and are not necessarily used to describe a specific order or a prioritization.

First Embodiment

Figure 1:
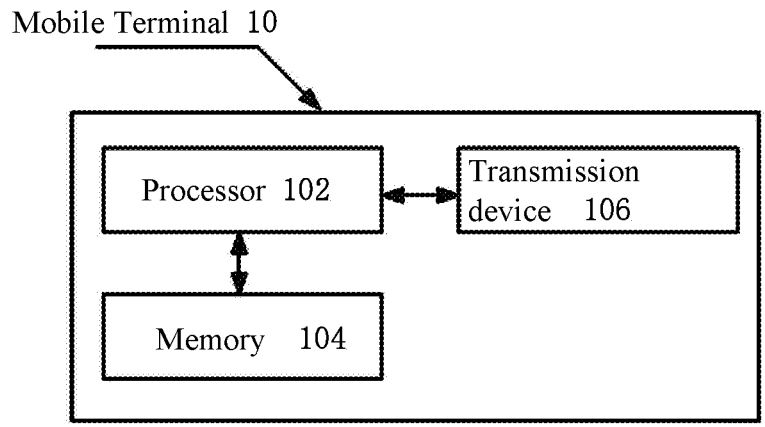
FIG. 1 is a block diagram showing a hardware structure of a mobile terminal implementing a method for determining a parameter of a reference signal according to an embodiment of the present disclosure.

The methods provided by the embodiments of the present application may be executed in an arithmetic operation device, such as a mobile terminal, a computer terminal device or the like. Taking a mobile terminal as an example, FIG. 1 is a hardware structural block diagram of a mobile terminal using the method for determining a parameter of a reference signal according to an embodiment of the present disclosure. As shown in FIG. 1, mobile terminal 10 may include one or more (only one shown) processor 102 (processor 102 may include a processing device, but is not limited to, a Microcontroller Unit (MCU) or a programmable logic device (Field Programmable Gate Array (FPGA)), a memory 104 for storing data, and a transmission device 106 for a communication function. It will be understood by those skilled person in the art that the structure shown in FIG. 1 is merely illustrative, and does not limit the structure of the above electronic device. For example, the mobile terminal 10 may also include more or fewer components than those shown in FIG. 1, or have a different configuration from that shown in FIG. 1.

The memory 104 can be used to store software programs and modules of the application software, such as program instructions/modules corresponding to the method for determining a parameter of a reference signal in the embodiments of the present disclosure, and the processor 102 runs the software programs and the modules stored in the memory 104, thereby performing various functional applications and data processing, i.e., implementing the above method. The memory 104 may include high speed random access memory, and may also include non-volatile memory such as one or more magnetic storage devices, flash memory, or other non-volatile solid state memory. In some examples, the memory 104 may further include memory remotely located relative to the processor 102, which may be connected to a mobile terminal 10 over a network. Examples of such networks include, but are not limited to, the Internet, Intranets, Local Area Networks, mobile communication networks, and combinations thereof.

The transmission device 106 is used for receiving or transmitting data via a network. The above specific network examples may include a wireless network provided by a communication provider of the mobile terminal 10. In one example, the transmission device 106 includes a Network Interface Controller (NIC) that can be connected to other network devices through a base station to communicate with the Internet. In one example, the transmission device 106 can be a Radio Frequency (RF) module for communicating with the Internet wirelessly.

Figure 2:
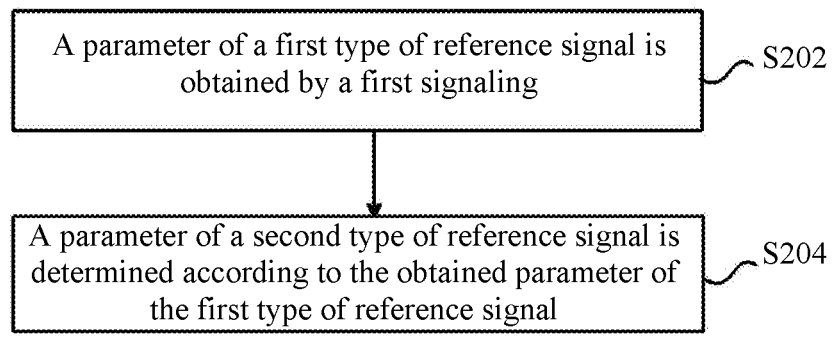
FIG. 2 is a flowchart of a method for determining a parameter of a reference signal according to an embodiment of the present disclosure.

In this embodiment, a method is provided for determining a parameter of a reference signal running on the mobile terminal. FIG. 2 is a flowchart of a method for determining a parameter of a reference signal according to an embodiment of the present disclosure. As shown in FIG. 2, the flowchart includes the following operations.

In operation S202, a parameter of a first type of reference signal is obtained by a first signaling.

In operation S204, a parameter of a second type of reference signal is determined according to the obtained parameter of the first type of reference signal.

Through the above operations, the parameter of the second type of reference signal can be determined by the parameter of the first type of reference signal, the parameter of the first type of reference signal is obtained only by the first signaling, and then the parameter of the second type of reference signal can be obtained correspondingly. Thus, it is not necessary to use additional signaling to individually transmit the parameter of the second type of reference signal, thereby reducing the signaling overhead. Therefore, it is possible to solve the problem of large signaling overhead required in obtaining the reference signal in the related art.

It is to be noted that the aforesaid first type of reference signal and/or the second type of reference signal may include at least one of: reference signal for data demodulation, reference signal for phase noise compensation, reference signal for Doppler shift compensation, or extended reference signal for data demodulation.

It is to be noted that the parameter of the second type of reference signal may be completely dependent on the parameter of the first type of reference signal, or may be not fully dependent on the parameter of the first type of reference signal. Therefore, in an embodiment of the present disclosure, the aforesaid operation S204 may include: directly determining the parameter of the second type of reference signal according to the parameter of the first type of reference signal; or determining, according to the parameter of the first type of reference signal and the first specified parameter of the second type of reference signal, the second specified parameter of the second type of reference signal, the first specified parameter being the same as or different from the second specified parameter.

It is to be noted that the aforesaid parameter of first type of reference signal may be determined according to signaling or other implicit rules; for example, resource allocation parameter, sub-frame type, and the length of the cyclic prefix (CP), etc., but not limited thereto.

It is to be noted that the aforesaid first specified parameter may be predefined in advance or may be specified by a base station, but not limited thereto.

It is to be noted that, before the determining the second specified parameter of the second type of reference signal according to the parameter of the first type of reference signal and the first specified parameter of the second type of reference signal, the method may further include: obtaining the first specified parameter of the second type of reference signal by a second signaling. That is to say, the parameter of the first type of reference signal can be obtained by the first signaling, at least part of the parameters of the second type of reference signal can be obtained by the second signaling, and the parameter of the second type of reference signal can be obtained based on the at least part of the parameters. Compared with the prior art, the signaling overhead is also reduced to some extent.

It is to be noted that the parameter of the first type of reference signal may indicate at least one of: a pattern of the first type of reference signal, a number of ports of the first type of reference signal, a port number of the first type of reference signal, a length of orthogonal code used by the first type of reference signal, an orthogonal code sequence used by the first type of reference signal, an index of the orthogonal code sequence used by the first type of reference signal, a transmission resource used by the first type of reference signal, a parameter used for generating a sequence for the first type of reference signal, a manner in which a sequence is generated for the first type of reference signal, a sequence type used by the first type of reference signal, a waveform used by the first type of reference signal, or a transmission mode used by the first type of reference signal.

The parameter of the second type of reference signal may indicate at least one of: a pattern of the second type of reference signal, a number of ports of the second type of reference signal, a port number of the second type of reference signal, a length of orthogonal code used by the second type of reference signal, an orthogonal code sequence used by the second type of reference signal, an index of the orthogonal code sequence used by the second type of reference signal, a transmission resource used by the second type of reference signal, a parameter used for generating a sequence for the second type of reference signal, a manner in which a sequence is generated for the second type of reference signal, a sequence type used by the second type of reference signal, a waveform used by the second type of reference signal, or a transmission mode used by the second type of reference signal. That is to say, at least one of the parameters of the first type of reference signal may determine at least one of the parameters of the second type of reference signal.

It is to be noted that the ports of the second type of reference signal are divided into multiple port groups, and the multiple port groups can be distinguished in a time division manner, but not limited thereto.

It is to be noted that the transmission resources used by the different ports of the second type of reference signal are completely different or partially different.

In an embodiment of the present disclosure, in the case that the parameter of the first type of reference signal is the transmission resource used by the first type of reference signal, the parameter of the second type of reference signal and/or the second specified parameter is the transmission resource used by the second type of reference signal, and the first specified parameter is a position where the second type of reference signal are located in the transmission resource, and the transmission resource includes at least one of: transmission bandwidth, transmission location, time-domain density, or frequency-domain density.

In an embodiment of the present disclosure, in the case that the number of ports of the second type of reference signal is smaller than the number of ports of the first type of reference signal, a transmission mode in which the second type of reference signal are transmitted is a transmission mode obtained by performing a predetermined operation on a transmission mode of a predetermined number of ports of the first type of reference signal.

It is to be noted that the aforesaid predetermined number may be determined by an association between a port of the first type of reference signal and a port of the second type of reference signal. For example, if one port of the second type of reference signal corresponds to four ports of the first type of reference signal, then the predetermined number is 4, but not limited thereto.

It is to be noted that the predetermined operation may be a summing operation, but not limited thereto.

In an embodiment of the present disclosure, in the case that the parameter of the first type of reference signal is an orthogonal sequence of the first type of reference signal, the parameter of the second type of reference signal and/or the second specified parameter is a subsequence of an orthogonal sequence of a first type of reference signal, and the first specified parameter is the length of the orthogonal sequences of the second type of reference signal.

It is to be noted that the subsequences of the orthogonal sequences corresponding to the multiple ports of the first type of reference signal are the same.

In an embodiment of the present disclosure, in the case that the parameter of the first type of reference signal is a pattern of the first type of reference signal, the parameter of the second type of reference signal and/or the second specified parameter is the pattern of the second type of reference signal, and the first specified parameter is the length of the orthogonal sequences of the second type of reference signal.

In an embodiment of the present disclosure, in the case that the parameter of the first type of reference signal is at least one of: the pattern, the number of ports, the port sequence, the length of the orthogonal sequence, or the orthogonal sequence, the parameter of the second type of reference signal and/or the second specified parameter is at least one of: the pattern, the number of ports, the port sequence, the length of the orthogonal sequence, or the orthogonal sequence, and the first specified parameter is a maximum number of ports of the second type of reference signal, and the maximum number of ports of the second type of reference signal is notified by a high layer signaling.

It is to be noted that multiple ports of the first type of reference signal use different orthogonal sequences and the same pseudo-random sequence; and multiple ports of the second type of reference signal use the same orthogonal sequence and different pseudo-random sequences.

In an embodiment of the present disclosure, before the operation S204, the method may further include: obtaining an association between the parameter of the first type of reference signal and the parameter of the second type of reference signal; and the operation S204 may be performed as follows: determining the parameter of the second type of reference signal according to the parameter of the first type of reference signal and the association.

In an embodiment of the present disclosure, the method may further include: determining whether to transmit the second type of reference signal according to whether the time-domain orthogonal sequences of the first type of reference signal are applied; or determining whether the time-domain orthogonal sequences of the first type of reference signal are applied according to a determination whether the second type of reference signal are transmitted.

In an embodiment of the present disclosure, when the parameter of the first type of reference signal is a number L1 of ports, the determining the parameter of the second type of reference signal according to the obtained parameter of the first type of reference signal including: dividing the L1 ports into L2 groups, and the ports of the first type of reference signal within each of the L2 groups corresponds to the same port of the second type of reference signal, where L1 and L2 are positive integers.

In an embodiment of the present disclosure, the sequence of the second type of reference signal is determined from a sequence of the first type of reference signal at a corresponding frequency-domain location.

In an embodiment of the present disclosure, the sequence of the second type of reference signal is a replicated sequence of the sequence of the first type of reference signal at a corresponding frequency-domain resource element.

In an embodiment of the present disclosure, the method further includes: obtaining, in a predefined manner or in a high layer signaling configuration manner, a location of a transmission resource block for the second type of reference signal in each sub-band, and each sub-band includes multiple transmission resource blocks, and division lengths of the sub-band are the same or different for different users.

In an embodiment, the subject performing the above operations may be a terminal device or the like, but not limited thereto.

Through the description of the above embodiments, those skilled person in the art can clearly understand that the method according to the aforesaid embodiments can be implemented by means of software as well as a necessary general hardware platform, and of course, can also be implemented through hardware. But in many cases, the former is a preferred implementation. Based on such understanding, those parts of the technical solution of the present disclosure, which are essential or make contributions to the prior art, may be embodied in the form of a software product stored in a storage medium (such as ROM/RAM, disk and optical disk). The storage medium includes a number of instructions for causing a terminal device (which may be a cell phone, a computer, a server, or a network device, etc.) to perform the methods described in various embodiments of the present disclosure.

Second Embodiment

Figure 3:
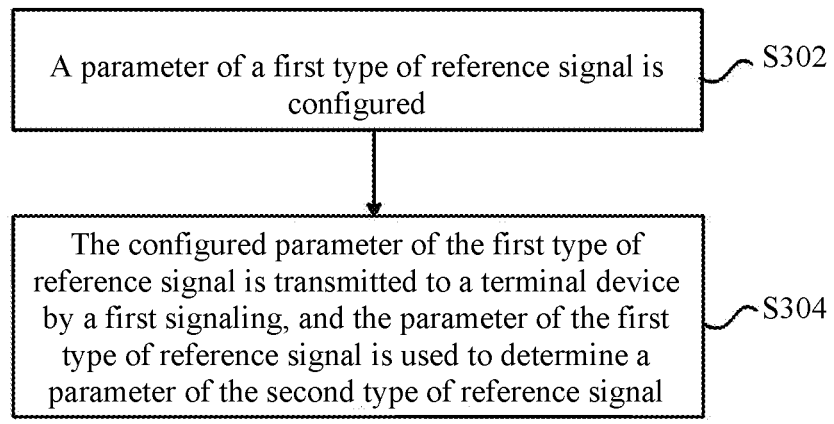
FIG. 3 is a schematic flowchart of a method for transmitting a parameter of a reference signal provided according to an embodiment of the present disclosure.

The embodiment of the present disclosure provides a method for transmitting a parameter of reference signal, and FIG. 3 is a schematic flowchart of a method for transmitting a parameter of a reference signal according to the embodiment of the present disclosure. As shown in FIG. 3, the method includes the following operations.

In operation S302, a parameter of a first type of reference signal is configured.

In operation S304, the configured parameter of the first type of reference signal is transmitted to a terminal device by a first signaling, and the parameter of the first type of reference signal is used to determine a parameter of the second type of reference signal.

Through the above operations, the parameter of the second type of reference signal can be determined by the parameter of the first type of reference signal, the parameter of the first type of reference signal is obtained only by the first signaling, and then the parameter of the second type of reference signal can be obtained accordingly. Thus, it is not necessary to use additional signaling to individually transmit the parameter of the second type of reference signal, thereby reducing the signaling overhead. Therefore, it is possible to solve the problem of large signaling overhead required in obtaining the reference signal in the related art.

It is to be noted that the aforesaid first type of reference signal and/or the second type of reference signal may include at least one of: reference signal for data demodulation, reference signal for phase noise compensation, reference signal for Doppler shift compensation, or extended reference signal for data demodulation.

It is to be noted that the parameter of the second type of reference signal may be determined by at least one of: determining the parameter of the second type of reference signal directly from the parameter of the first type of reference signal; or determining the parameter of the second type of reference signal jointly from the parameter of the first type of reference signal and the first specified parameter of the second type of reference signal.

It is to be noted that the aforesaid method may further include: transmitting, by a second signaling, the first specified parameter of the second type of reference signal to the terminal device.

It is to be noted that the parameter of the first type of reference signal includes at least one of: a pattern of the first type of reference signal, a number of ports of the first type of reference signal, a port number of the first type of reference signal, a length of orthogonal code used by the first type of reference signal, an orthogonal code sequence used by the first type of reference signal, an index of the orthogonal code sequence used by the first type of reference signal, a transmission resource used by the first type of reference signal, a parameter used for generating a sequence for the first type of reference signal, a manner in which a sequence is generated for the first type of reference signal, a sequence type used by the first type of reference signal, a waveform used by the first type of reference signal, or a transmission mode used by the first type of reference signal.

The parameter of the second type of reference signal includes at least one of: a pattern of the second type of reference signal, a number of ports of the second type of reference signal, a port number of the second type of reference signal, a length of orthogonal code used by the second type of reference signal, an orthogonal code sequence used by the second type of reference signal, an index of the orthogonal code sequence used by the second type of reference signal, a transmission resource used by the second type of reference signal, a parameter used for generating a sequence for the second type of reference signal, a manner in which a sequence is generated for the second type of reference signal, a sequence type used by the second type of reference signal, a waveform used by the second type of reference signal or a transmission mode used by the second type of reference signal.

It is to be noted that the ports of the second type of reference signal are divided into multiple port groups, and the multiple port groups are distinguished in a time division manner.

It is to be noted that transmission resources used by different ports of the second type of reference signal are completely different or partially different.

In an embodiment of the present disclosure, in the case that the parameter of the first type of reference signal is a transmission resource used by the first type of reference signal, a parameter of the second type of reference signal is a transmission resource used by the second type of reference signal, and the first specified parameter is a position where the second type of reference signal are located in the transmission resource, and the transmission resource includes at least one of: transmission bandwidth, transmission location, time-domain density or frequency-domain density.

In an embodiment of the present disclosure, in the case that the number of ports of the second type of reference signal is smaller than the number of ports of the first type of reference signal, a transmission mode in which the second type of reference signal are transmitted is a transmission mode obtained by performing a predetermined operation on a transmission mode of a predetermined number of ports of the first type of reference signal.

In an embodiment of the present disclosure, in the case that the parameter of the first type of reference signal is an orthogonal sequence of the first type of reference signal, the parameter of the second type of reference signal indicate subsequences of the orthogonal sequences of the first type of reference signal, and the first specified parameter is the length of the orthogonal sequences of the second type of reference signal.

It is to be noted that the subsequences of the orthogonal sequences corresponding to the multiple ports of the first type of reference signal are the same.

In an embodiment of the present disclosure, in the case that the parameter of the first type of reference signal is a pattern of the first type of reference signal, the parameter of the second type of reference signal and/or the second specified parameter is a pattern of the second type of reference signal, and the first specified parameter is the length of the orthogonal sequences of the second type of reference signal.

In an embodiment of the present disclosure, in the case that the parameter of the first type of reference signal is at least one of: the pattern, the number of ports, the port sequence, the length of the orthogonal sequence, or the orthogonal sequence, the parameter of the second type of reference signal and/or the second specified parameter is at least one of: the pattern, the number of ports, the port sequence, the length of the orthogonal sequence, or an orthogonal sequence, and the first specified parameter is a maximum number of ports of the second type of reference signal, and the maximum number of ports of the second type of reference signal is notified by a high layer signaling.

In an embodiment of the present disclosure, multiple ports of the first type of reference signal use different orthogonal sequences and the same pseudo-random sequence; and multiple ports of the second type of reference signal use the same orthogonal sequence and different pseudo-random sequences.

In an embodiment of the present disclosure, before the operation S304, the method may further include: receiving indication information fed back from the terminal device and for indicating an association between the parameter of the first type of reference signal and a parameter of the second type of reference signal; and configuring the association between the parameter of the first type of reference signal and a parameter of the second type of reference signal according to the indication information.

It is to be noted that the aforesaid indication information may include at least one of: a port association between the first type of reference signal and the second type of reference signal, or a number of ports of the second type of reference signal.

In an embodiment of the present disclosure, the method may further include: configuring application of the time-domain orthogonal sequence of the first type of reference signal or configuring transmission of the second type of reference signal.

In an embodiment of the present disclosure, when the parameter of the first type of reference signal is a number L1 of ports, determining the parameter of the second type of reference signal according to the obtained parameter of the first type of reference signal include: dividing the L1 ports into L2 groups, the ports of the first type of reference signal of each of the L2 groups corresponding to the same port of the second type of reference signal, and where L1 and L2 are positive integers.

In an embodiment of the present disclosure, the sequence of the second type of reference signal is determined from a sequence of the first type of reference signal at a corresponding frequency-domain location.

In an embodiment of the present disclosure, the sequence of the second type of reference signal is a replicated sequence of the sequence of the first type of reference signal at a corresponding frequency-domain resource element.

In an embodiment of the present disclosure, the method further includes: configuring a position of transmission resource block for the second type of reference signal in each sub-band in a predefined manner or in a high layer signaling manner, each sub-band including multiple transmission resource blocks, and division lengths of the sub-band are the same or different for different users.

In an embodiment, the subject for performing the aforesaid operations may be a base station, but not limited thereto.

Through the description of the above embodiments, those skilled person in the art can clearly understand that the method according to the aforesaid embodiments can be implemented by means of software as well as a necessary general hardware platform, and of course, can also be implemented through hardware. But in many cases, the former is a preferred implementation. Based on such understanding, those parts of the technical solution of the present disclosure, which are essential or make contributions to the prior art, may be embodied in the form of a software product stored in a storage medium (such as ROM/RAM, disk and optical disk). The storage medium includes a number of instructions for causing a terminal device (which may be a cell phone, a computer, a server, or a network device, etc.) to perform the methods described in various embodiments of the present disclosure.

Third Embodiment

The embodiment of the present disclosure further provides an apparatus for determining a parameter of the reference signal, which is used to implement the above-mentioned embodiments and preferred embodiments, and those already described will be not elaborated. As used below, the term "module" may be a combination of software and/or hardware implementing predetermined functions. Although the devices described in the following embodiments are preferably implemented in software, an implementation in hardware or a combination of software and hardware is also possible and contemplated.

Figure 4:
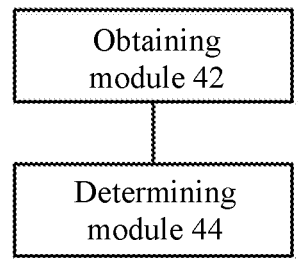
FIG. 4 is a structural block diagram of an apparatus for determining a parameter of reference signals according to an embodiment of the present disclosure.

FIG. 4 is a structural block diagram of an apparatus for determining a parameter of a reference signal according to an embodiment of the present disclosure. As shown in FIG. 4, the apparatus includes: an obtaining module 42, configured to obtain, by a first signaling, parameter of a first type of reference signal; a determining module 44 communicated with the obtaining module 42, configured to determine parameter of a second type of reference signal according to the obtained parameter of the first type of reference signal.

Through the above apparatus, the parameter of the second type of reference signal can be determined by the parameter of the first type of reference signal, the parameter of the first type of reference signal is obtained only by the first signaling, and then the parameter of the second type of reference signal can be obtained accordingly. Thus, it is not necessary to use additional signaling to individually transmit the parameter of the second type of reference signal, thereby reducing the signaling overhead. Therefore, it is possible to solve the problem of large signaling overhead required in obtaining the reference signal in the related art.

It is to be noted that the aforesaid first type of reference signal and/or the second type of reference signal may include at least one of: reference signal for data demodulation, reference signal for phase noise compensation, reference signal for Doppler shift compensation, or extended reference signal for data demodulation.

It is to be noted that the parameter of the second type of reference signal may be completely dependent on the parameter of the first type of reference signal, but may be not fully dependent on the parameter of the first type of reference signal. The determining module 44 may be configured to: directly determine the parameter of the second type of reference signal according to the parameter of the first type of reference signal; or determine, according to the parameter of the first type of reference signal and a first specified parameter of the second type of reference signal, a second specified parameter of the second type of reference signal, and the first specified parameter is the same as or different from the second specified parameter.

It is to be noted that the obtaining module 42 may be further configured to obtain the first specified parameter of the second type of reference signal by a second signaling.

It is to be noted that the parameter of the first type of reference signal includes at least one of: a pattern of the first type of reference signal, a number of ports of the first type of reference signal, a port number of the first type of reference signal, a length of orthogonal code used by the first type of reference signal, an orthogonal code sequence used by the first type of reference signal, an index of the orthogonal code sequence used by the first type of reference signal, a transmission resource used by the first type of reference signal, a parameter used for generating a sequence for the first type of reference signal, a manner in which a sequence is generated for the first type of reference signal, a sequence type used by the first type of reference signal, a waveform used by the first type of reference signal, or a transmission mode used by the first type of reference signal.

The parameter of the second type of reference signal includes at least one of: a pattern of the second type of reference signal, a number of ports of the second type of reference signal, a port number of the second type of reference signal, a length of orthogonal code used by the second type of reference signal, an orthogonal code sequence used by the second type of reference signal, an index of the orthogonal code sequence used by the second type of reference signal, a transmission resource used by the second type of reference signal, a parameter used for generating a sequence for the second type of reference signal, a manner in which a sequence is generated for the second type of reference signal, a sequence type used by the second type of reference signal, a waveform used by the second type of reference signal or a transmission mode used by the second type of reference signal.

It is to be noted that the ports of the second type of reference signal are divided into multiple port groups, and the multiple port groups can be distinguished in a time division manner, but not limited thereto.

It is to be noted that the transmission resources used by different ports of the second type of reference signal are completely different or partially different.

In an embodiment, in the case that parameter of the first type of reference signal is the transmission resource used by the first type of reference signal, the parameter of the second type of reference signal and/or the second specified parameter is the transmission resource used by the second type of reference signal, and the first specified parameter is a position where the second type of reference signal are located in the transmission resource, and the transmission resource includes at least one of: transmission bandwidth, transmission location, time-domain density, or frequency-domain density.

In an embodiment, in the case that the number of ports of the second type of reference signal is smaller than the number of ports of the first type of reference signal, a transmission mode in which the second type of reference signal are transmitted is a transmission mode obtained by performing a predetermined operation on a transmission mode of a predetermined number of ports of the first type of reference signal.

In an embodiment, in the case that the parameter of the first type of reference signal is an orthogonal sequence of the first type of reference signal, the parameter of the second type of reference signal and/or the second specified parameter is a subsequence of an orthogonal sequence of the first type of reference signal, and the first specified parameter is a length of the orthogonal sequence of the second type of reference signal.

It is to be noted that the subsequences of the orthogonal sequences corresponding to the multiple ports of the first type of reference signal are the same.

In an embodiment, in the case that the parameter of the first type of reference signal is a pattern of the first type of reference signal, the parameter of the second type of reference signal and/or the second specified parameter is a pattern of the second type of reference signal, and the first specified parameter is the length of the orthogonal sequences of the second type of reference signal.

In an embodiment of the present disclosure, in the case that the parameter of the first type of reference signal is at least one of: the pattern, the number of ports, the port sequence, the length of the orthogonal sequence, or the orthogonal sequence, the parameter of the second type of reference signal and/or the second specified parameter is at least one of: the pattern, the number of ports, the port sequence, the length of the orthogonal sequence, or the orthogonal sequence, and the first specified parameter is a maximum number of ports of the second type of reference signal, and the maximum number of ports of the second type of reference signal is notified by a high layer signaling.

It is to be noted that multiple ports of the first type of reference signal use different orthogonal sequences and the same pseudo-random sequence; and multiple ports of the second type of reference signal use the same orthogonal sequence and different pseudo-random sequences.

In an embodiment of the present disclosure, the obtaining module 42 may be further configured to obtain an association between parameter of the first type of reference signal and a parameter of the second type of reference signal; and the determining module 44 may be further configured to perform: determining the parameter of the second type of reference signal according to the parameter of the first type of reference signal and the association.

In an embodiment of the present disclosure, the apparatus further includes: a receiving module, which is communicated with the determining module 44 and configured to determine whether to transmit the second type of reference signal according to whether time-domain orthogonal sequences of the first type of reference signal are applied; or determining whether the time-domain orthogonal sequences of the first type of reference signal are applied according to a determination whether the second type of reference signal are transmitted.

In an embodiment of the present disclosure, the determining module 44 is configured to, when the parameter of the first type of reference signal is a number L1 of ports, divide the L1 ports into L2 groups, and the ports of the first type of reference signal within each of the L2 groups correspond to the same port of the second type of reference signal; and where L1 and L2 are positive integers.

In an embodiment of the present disclosure, the sequence of the second type of reference signal is determined from a sequence of the first type of reference signal at a corresponding frequency-domain location.

In an embodiment of the present disclosure, the sequence of the second type of reference signal is a replicated sequence of the sequence of the first type of reference signal at a corresponding frequency-domain resource element.

In an embodiment of the present disclosure, the obtaining module 42 may be further configured to obtain a location of a transmission resource block for the second type of reference signal in each sub-band in a predefined manner or in a high layer signaling configuration manner, and each sub-band includes multiple transmission resource blocks, and division lengths of the sub-band are the same or different for different users.

In an embodiment, the above apparatuses may be located in the terminal device, but not limited thereto.

It is to be noted that each of the aforesaid modules may be implemented in software or hardware. For the latter, it may be implemented in the following manners, but not limited to: the aforesaid modules are all located in the same processor; or, the aforesaid modules are located in different processors separately in any combination form.

Fourth Embodiment

Figure 5:
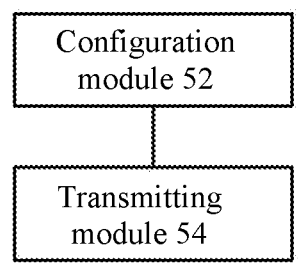
FIG. 5 is a structural block diagram of an apparatus for transmitting a parameter of a reference signal according to an embodiment of the present disclosure.

The embodiment of the present disclosure provides an apparatus for transmitting a a parameter of reference signal, and FIG. 5 is a structural block diagram of an apparatus for transmitting a parameter of a reference signal according to an embodiment of the present disclosure.

As shown in FIG. 5, the apparatus includes: a configuration module 52, configured to configure a parameter of a first type of reference signal; a transmitting module 54, which is communicated with the configuration module 52 and configured to transmit the configured parameter of the first type of reference signal to a terminal device by a first signaling, and the parameter of the first type of reference signal is used to determine a parameter of the second type of reference signal.

Through the above apparatus, the parameter of the second type of reference signal can be determined by the parameter of the first type of reference signal, the parameter of the first type of reference signal is obtained only by the first signaling, and then the parameter of the second type of reference signal can be obtained accordingly. Thus, it is not necessary to use additional signaling to individually transmit the parameter of the second type of reference signal, thereby reducing the signaling overhead. Therefore, it is possible to solve the problem of large signaling overhead required in obtaining the reference signal in the related art.

It is to be noted that the aforesaid first type of reference signal and/or the second type of reference signal may include at least one of: reference signal for data demodulation, reference signal for phase noise compensation, reference signal for Doppler shift compensation, or extended reference signal for data demodulation.

It is to be noted that the parameter of the second type of reference signal may be determined by at least one of: determining the parameter of the second type of reference signal directly from the parameter of the first type of reference signal; or determining the parameter of the second type of reference signal jointly from the parameter of the first type of reference signal and the first specified parameter of the second type of reference signal.

It is to be noted that the transmitting module 54 may be further configured to transmit the first specified parameter of the second type of reference signal to the terminal device by a second signaling.

It is to be noted that the parameter of the first type of reference signal includes at least one of: a pattern of the first type of reference signal, a number of ports of the first type of reference signal, a port number of the first type of reference signal, a length of orthogonal code used by the first type of reference signal, an orthogonal code sequence used by the first type of reference signal, an index of the orthogonal code sequence used by the first type of reference signal, a transmission resource used by the first type of reference signal, a parameter used for generating a sequence for the first type of reference signal, a manner in which a sequence is generated for the first type of reference signal, a sequence type used by the first type of reference signal, a waveform used by the first type of reference signal, or a transmission mode used by the first type of reference signal;

The parameter of the second type of reference signal may indicate at least one of: a pattern of the second type of reference signal, a number of ports of the second type of reference signal, a port number of the second type of reference signal, a length of orthogonal code used by the second type of reference signal, an orthogonal code sequence used by the second type of reference signal, an index of the orthogonal code sequence used by the second type of reference signal, a transmission resource used by the second type of reference signal, a parameter used for generating a sequence for the second type of reference signal, a manner in which a sequence is generated for the second type of reference signal, a sequence type used by the second type of reference signal, a waveform used by the second type of reference signal or a transmission mode used by the second type of reference signal.

It is to be noted that the ports of the second type of reference signal are divided into multiple port groups, and the multiple port groups can be distinguished in a time division manner.

It is to be noted that the transmission resources used by different ports of the second type of reference signal are completely different or partially different.

In an embodiment of the present disclosure, in the case that parameter of the first type of reference signal is the transmission resource used by the first type of reference signal, the parameter of the second type of reference signal is the transmission resource used by the second type of reference signal, and the first specified parameter is a position where the second type of reference signal are located in the transmission resource, and the transmission resource includes at least one of: transmission bandwidth, transmission location, time-domain density, or frequency-domain density.

In an embodiment of the present disclosure, in the case that the number of ports of the second type of reference signal is smaller than the number of ports of the first type of reference signal, a transmission mode in which the second type of reference signal are transmitted is a transmission mode obtained by performing a predetermined operation on a transmission mode of a predetermined number of ports of the first type of reference signal.

In an embodiment of the present disclosure, in the case that the parameter of the first type of reference signal is an orthogonal sequence of the first type of reference signal, the parameter of the second type of reference signal is a subsequence of an orthogonal sequence of the first type of reference signal, and the first specified parameter is a length of the orthogonal sequence of the second type of reference signal.

It is to be noted that the subsequences of the orthogonal sequences corresponding to the multiple ports of the first type of reference signal are the same.

In an embodiment, in the case that the parameter of the first type of reference signal is a pattern of the first type of reference signal, the parameter of the second type of reference signal and/or the second specified parameter is a pattern of the second type of reference signal, and the first specified parameter is the length of the orthogonal sequences of the second type of reference signal.

In an embodiment of the present disclosure, in the case that the parameter of the first type of reference signal is at least one of: the pattern, the number of ports, the port sequence, the length of the orthogonal sequence, or the orthogonal sequence, the parameter of the second type of reference signal and/or the second specified parameter is at least one of: the pattern, the number of ports, the port sequence, the length of the orthogonal sequence, or the orthogonal sequence, and the first specified parameter is a maximum number of ports of the second type of reference signal, and the maximum number of ports of the second type of reference signal is notified by a high layer signaling.

In an embodiment of the present disclosure, the multiple ports of the first type of reference signal use different orthogonal sequences and the same pseudo-random sequence; and the multiple ports of the second type of reference signal use the same orthogonal sequence and different pseudo-random sequences.

In an embodiment of the present disclosure, the apparatus may further include: a receiving module, which is communicated with the configuration module 52 and configured to receive indication information fed back from the terminal device and for indicating an association between parameter of the first type of reference signal and a parameter of the second type of reference signal. The configuration module 52 is further used to configure an association between parameter of the first type of reference signal and a parameter of the second type of reference signal according to the indication information.

It is to be noted that the indication information may include at least one of: a port association between the first type of reference signal and the second type of reference signal, or a number of ports of the second type of reference signal.

In an embodiment, the configuration module 52 is further configured to configure application of the time-domain orthogonal sequence of the first type of reference signal or configure transmission of the second type of reference signal.

In an embodiment, when the parameter of the first type of reference signal is a number L1 of ports, the determining manner of the parameter of the second type of reference signal include: dividing the L1 ports into L2 groups, and the ports of the first type of reference signal of each group in the L2 groups correspond to the same port of the second type of reference signal, and where L1 and L2 are positive integers.

In an embodiment of the present disclosure, the sequence of the second type of reference signal is determined from a sequence of the first type of reference signal at a corresponding frequency-domain location.

In an embodiment of the present disclosure, the sequence of the second type of reference signal is a replicated sequence of the sequence of the first type of reference signal at a corresponding frequency-domain resource element.

In an embodiment of the present disclosure, the configuration module 52 is further configured to configure a location of a transmission resource block for the second type of reference signal in each sub-band in a predefined manner or in a high layer signaling manner, each sub-band including multiple transmission resource blocks, and division lengths of the sub-band being the same or different for different users.

In an embodiment, the above apparatus may be located in the base station, but not limited thereto.

It is to be noted that each of the aforesaid modules may be implemented in software or hardware. For the latter, it may be implemented in the following manners, but not limited to: the aforesaid modules are all located in the same processor; or, the aforesaid modules are located in different processors separately in any combination form.

Fifth Embodiment

Figure 6:
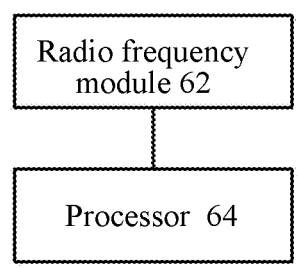
FIG. 6 is a schematic structural diagram of a terminal device provided according to an embodiment of the present disclosure.

The embodiment of the present disclosure further provides a terminal device. FIG. 6 is a schematic structural diagram of a terminal device according to an embodiment of the present disclosure.

As shown in FIG. 6, the terminal device includes: a radio frequency module 62, configured to obtain a parameter of a first type of reference signal by a first signaling; a processor 64, which is communicated with the radio frequency module 62 and configured to determine a parameter of a second type of reference signal according to the obtained parameter of the first type of reference signal.

Through the aforesaid terminal device, the parameter of the second type of reference signal can be determined by the parameter of the first type of reference signal, the parameter of the first type of reference signal is obtained only by the first signaling, and then the parameter of the second type of reference signal can be obtained accordingly. Thus, it is not necessary to use additional signaling to individually transmit the parameter of the second type of reference signal, thereby reducing the signaling overhead. Therefore, it is possible to solve the problem of large signaling overhead required in obtaining the reference signal in the related art.

It is to be noted that the aforesaid first type of reference signal and/or the second type of reference signal may include at least one of: reference signal for data demodulation, reference signal for phase noise compensation, reference signal for Doppler shift compensation, or extended reference signal for data demodulation.

It is to be noted that the parameter of the second type of reference signal may be completely dependent on the parameter of the first type of reference signal, but may be not fully dependent on the parameter of the first type of reference signal. The processor 64 may be configured to: directly determine the parameter of the second type of reference signal according to the parameter of the first type of reference signal; or determine a second specified parameter of the second type of reference signal according to the parameter of the first type of reference signal and a first specified parameter of the second type of reference signal, and the first specified parameter is the same as or different from the second specified parameter.

It is to be noted that the radio frequency module 62 may be further configured to obtain the first specified parameter of the second type of reference signal by a second signaling.

It is to be noted that the parameter of the first type of reference signal includes at least one of: a pattern of the first type of reference signal, a number of ports of the first type of reference signal, a port number of the first type of reference signal, a length of orthogonal code used by the first type of reference signal, an orthogonal code sequence used by the first type of reference signal, an index of the orthogonal code sequence used by the first type of reference signal, a transmission resource used by the first type of reference signal, a parameter used for generating a sequence for the first type of reference signal, a manner in which a sequence is generated for the first type of reference signal, a sequence type used by the first type of reference signal, a waveform used by the first type of reference signal, or a transmission mode used by the first type of reference signal.

The parameter of the second type of reference signal may indicate at least one of: a pattern of the second type of reference signal, a number of ports of the second type of reference signal, a port number of the second type of reference signal, a length of orthogonal code used by the second type of reference signal, an orthogonal code sequence used by the second type of reference signal, an index of the orthogonal code sequence used by the second type of reference signal, a transmission resource used by the second type of reference signal, a parameter used for generating a sequence for the second type of reference signal, a manner in which a sequence is generated for the second type of reference signal, a sequence type used by the second type of reference signal, a waveform used by the second type of reference signal or a transmission mode used by the second type of reference signal.

It is to be noted that the ports of the second type of reference signal are divided into multiple port groups, and the multiple port groups can be distinguished in a time division manner, but not limited thereto.

It is to be noted that the transmission resources used by different ports of the second type of reference signal are completely different or partially different.

In an embodiment of the present disclosure, in the case that parameter of the first type of reference signal is the transmission resource used by the first type of reference signal, the parameter of the second type of reference signal and/or the second specified parameter is the transmission resource used by the second type of reference signal, and the first specified parameter is a position where the second type of reference signal are located in the transmission resource, and the transmission resource includes at least one of: transmission bandwidth, transmission location, time-domain density, or frequency-domain density.

In an embodiment of the present disclosure, in the case that the number of ports of the second type of reference signal is smaller than the number of ports of the first type of reference signal, a transmission mode in which the second type of reference signal are transmitted is a transmission mode obtained by performing a predetermined operation on a transmission mode of a predetermined number of ports of the first type of reference signal.

In an embodiment of the present disclosure, in the case that the parameter of the first type of reference signal is an orthogonal sequence of the first type of reference signal, the parameter of the second type of reference signal and/or the second specified parameter is a subsequence of an orthogonal sequence of the first type of reference signal, and the first specified parameter is a length of the orthogonal sequence of the second type of reference signal.

It is to be noted that the subsequences of the orthogonal sequences corresponding to the multiple ports of the first type of reference signal are the same.

In an embodiment of the present disclosure, in the case that the parameter of the first type of reference signal is at least one of: the pattern, the number of ports, the port sequence, the length of the orthogonal sequence, or the orthogonal sequence, the parameter of the second type of reference signal and/or the second specified parameter is at least one of: the pattern, the number of ports, the port sequence, the length of the orthogonal sequence, or the orthogonal sequence, and the first specified parameter is a maximum number of ports of the second type of reference signal, and the maximum number of ports of the second type of reference signal is notified by a high layer signaling.

It is to be noted that multiple ports of the first type of reference signal use different orthogonal sequences and the same pseudo-random sequence; and multiple ports of the second type of reference signal use the same orthogonal sequence and different pseudo-random sequences.

In an embodiment of the present disclosure, the radio frequency module 62 may be configured to obtain an association between parameter of the first type of reference signal and a parameter of the second type of reference signal; and the processor 64 may be configured to determine the parameter of the second type of reference signal according to the parameter of the first type of reference signal and the association.

In an embodiment of the present disclosure, the processor 64 may be further configured to determine whether to transmit the second type of reference signal according to whether time-domain orthogonal sequences of the first type of reference signal are applied; or determining whether the time-domain orthogonal sequences of the first type of reference signal are applied according to the determination whether to transmit the second type of reference signal.

In an embodiment of the present disclosure, the processor 64 is further configured to, when the parameter of the first type of reference signal is a number L1 of ports, divide the L1 ports into L2 groups, and the ports of the first type of reference signal within each of the L2 groups correspond to the same port of the second type of reference signal, where L1 and L2 are positive integers.

In an embodiment, the sequence of the second type of reference signal is determined from a sequence of the first type of reference signal at a corresponding frequency-domain location.

In an embodiment of the present disclosure, the sequence of the second type of reference signal is a replicated sequence of the sequence of the first type of reference signal at a corresponding frequency-domain resource element.

In an embodiment of the present disclosure, the processor 64 may be further configured to obtain a location of a transmission resource block for the second type of reference signal in each sub-band in a predefined manner or in a high layer signaling configuration manner, each sub-band including multiple transmission resource blocks, and division lengths of the sub-band being the same or different for different users.

Sixth Embodiment

Figure 7:
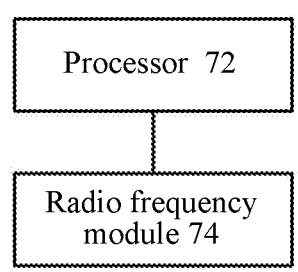
FIG. 7 is a structural block diagram of a base station provided according to an embodiment of the present disclosure.

The embodiment of the present disclosure the present disclosure further provides a base station, and FIG. 7 is a structural block diagram of a base station according to an embodiment of the present disclosure.

As shown in FIG. 7, the base station includes: a processor 72, configured to configure a parameter of the first type of reference signal; and a radio frequency module 74, which is communicated with the processor 72 and configured to transmit the configured parameter of the first type of reference signal to the terminal device by a first signaling, the parameter of the first type of reference signal being used to determine a parameter of the second type of reference signal.

Through the above base station, because the parameter of the second type of reference signal can be determined by the parameter of the first type of reference signal, the parameter of the first type of reference signal is obtained only by the first signaling, the parameter of the second type of reference signal can be obtained accordingly. It is not necessary to use additional signaling to individually transmit the parameter of the second type of reference signal, thereby reducing the signaling overhead. Therefore, it is possible to solve the problem of large signaling overhead required in obtaining the reference signal in the related art.

It is to be noted that the aforesaid first type of reference signal and/or the second type of reference signal may include at least one of: reference signal for data demodulation, reference signal for phase noise compensation, reference signal for Doppler shift compensation, or extended reference signal for data demodulation.

It is to be noted that the parameter of the second type of reference signal may be determined by at least one of: determining the parameter of the second type of reference signal directly from the parameter of the first type of reference signal; or determining the parameter of the second type of reference signal jointly from the parameter of the first type of reference signal and the first specified parameter of the second type of reference signal.

It is to be noted that the aforesaid radio frequency module 74 may be further configured to transmit, by a second signaling, the first specified parameter of the second type of reference signal to the terminal device.

It is to be noted that the parameter of the first type of reference signal include at least one of: a pattern of the first type of reference signal, a number of ports of the first type of reference signal, a port number of the first type of reference signal, a length of orthogonal code used by the first type of reference signal, an orthogonal code sequence used by the first type of reference signal, an index of the orthogonal code sequence used by the first type of reference signal, a transmission resource used by the first type of reference signal, a parameter used for generating a sequence for the first type of reference signal, a manner in which a sequence is generated for the first type of reference signal, a sequence type used by the first type of reference signal, a waveform used by the first type of reference signal, or a transmission mode used by the first type of reference signal.

The parameter of the second type of reference signal include at least one of: a pattern of the second type of reference signal, a number of ports of the second type of reference signal, a port number of the second type of reference signal, a length of orthogonal code used by the second type of reference signal, an orthogonal code sequence used by the second type of reference signal, an index of the orthogonal code sequence used by the second type of reference signal, a transmission resource used by the second type of reference signal, a parameter used for generating a sequence for the second type of reference signal, a manner in which a sequence is generated for the second type of reference signal, a sequence type used by the second type of reference signal, a waveform used by the second type of reference signal or a transmission mode used by the second type of reference signal.

It is to be noted that the ports of the second type of reference signal are divided into multiple port groups, and the multiple port groups can be distinguished in a time division manner.

It is to be noted that the transmission resources used by different ports of the second type of reference signal are completely different or partially different.

In an embodiment of the present disclosure, in the case that the parameter of the first type of reference signal is the transmission resource used by the first type of reference signal, the parameter of the second type of reference signal is the transmission resource used by the second type of reference signal, and the first specified parameter is a position where the second type of reference signal are located in the transmission resource, and the transmission resource includes at least one of: transmission bandwidth, transmission location, time-domain density, or frequency-domain density.

In an embodiment of the present disclosure, in the case that the number of ports of the second type of reference signal is smaller than the number of ports of the first type of reference signal, a transmission mode in which the second type of reference signal are transmitted is a transmission mode obtained by performing a predetermined operation on a transmission mode of a predetermined number of ports of the first type of reference signal.

In an embodiment of the present disclosure, in the case that the parameter of the first type of reference signal is an orthogonal sequence of the first type of reference signal, the parameter of the second type of reference signal is a subsequence of an orthogonal sequence of the first type of reference signal, and the first specified parameter is a length of the orthogonal sequence of the second type of reference signal.

It is to be noted that the subsequences of the orthogonal sequences corresponding to the multiple ports of the first type of reference signal are the same.

In an embodiment, in the case that the parameter of the first type of reference signal is a pattern of the first type of reference signal, the parameter of the second type of reference signal and/or the second specified parameter is a pattern of the second type of reference signal, and the first specified parameter is the length of the orthogonal sequences of the second type of reference signal.

In an embodiment of the present disclosure, in the case that the parameter of the first type of reference signal is at least one of: the pattern, the number of ports, the port sequence, the length of the orthogonal sequence, or the orthogonal sequence, the parameter of the second type of reference signal and/or the second specified parameter is at least one of: the pattern, the number of ports, the port sequence, the length of the orthogonal sequence, or the orthogonal sequence, and the first specified parameter is a maximum number of ports of the second type of reference signal, and the maximum number of ports of the second type of reference signal is notified by a high layer signaling.

In an embodiment of the present disclosure, multiple ports of the first type of reference signal use different orthogonal sequences and the same pseudo-random sequence; multiple ports of the second type of reference signal use the same orthogonal sequence and different pseudo-random sequences.

In an embodiment of the present disclosure, the radio frequency module 74 is further configured to receive indication information fed back from the terminal device and for indicating an association between parameter of the first type of reference signal and a parameter of the second type of reference signal; and the processor 72 is further configured to configure an association between parameter of the first type of reference signal and a parameter of the second type of reference signal according to the indication information.

It is to be noted that the aforesaid indication information may include at least one of: a port association between the first type of reference signal and the second type of reference signal, or a number of ports of the second type of reference signal.

In an embodiment of the present disclosure, the processor 72 may be further configured to configure an application of a time-domain orthogonal sequence of the first type of reference signal; or to configure transmission of the second type of reference signal.

In an embodiment of the present disclosure, the processor 72 may be further configured to configure, in a predefined manner or in a high layer signaling manner, a location of transmission resource blocks of the second type of reference signal in each sub-band, each sub-band including multiple transmission resource blocks, and the length of sub-band division being the same or different for different users.

Seventh Embodiment

An embodiment of the present disclosure also provides a computer storage medium. Alternatively, in the present embodiment, the above storage medium may be configured to store a program code for executing the operations of the method in the first or second embodiment.

It can be understood that the aforesaid storage medium may include, but is not limited to, a U disk, a Read-Only Memory (ROM), a Random Access Memory (RAM), a mobile hard disk, a magnetic disk, an optical disk or any kind of medium in which the program code can be stored.

In the present embodiment, the processor performs the operations of the method in the first or second embodiment according to the stored program code in the storage medium.

For specific examples in this embodiment, reference may be made to the examples described in the aforesaid embodiments and the optional embodiments, and details will not be elaborated.

It is to be noted that, in the present application, the length of the orthogonal sequence may also be referred to as a length of orthogonal codes. The orthogonal sequence may also be referred to as an orthogonal code sequence, and an index of the orthogonal sequence may also be referred to as an index of the orthogonal code sequence.

In order to better understand the embodiments of the present disclosure, the present disclosure will be further explained in conjunction with the preferred embodiments.

Embodiments of the present disclosure share a specific signaling parameter between a first type of reference signal and a second type of reference signal to reduce signaling overhead. In the meantime, orthogonal sequences used by the reference signal are effectively allocated to achieve more efficient orthogonal multiplexing among users.

The first communication node described in the present application generally refers to a device such as a base station, and the second communication node refers to a device such as a user terminal.

In general, the first type of reference signal described in this application refer to reference signals for data demodulation, such as Demodulation Reference Signals. The second type of reference signal refer to reference signals used for phase noise compensation, Doppler shift compensation, etc., and they may also be extended data demodulation reference signals. That is to say, the second type of reference signal may be data demodulation reference signals, and may also be other types of reference signals, such as reference signals that allows the receiving side to compensate for phase noise. As another example, both types of reference signals can be used to demodulate data. Alternatively, one of the two types of reference signals is used to demodulate data, and the other is used to measure Channel State Information (CSI). Alternatively, the two types of reference signals are two subsets of reference signals.

In NR, since the high frequency band carrier, that is, the bandwidth with a high center frequency, is probably be used, the influence of phase noise cannot be ignored, especially when data is transmitted using a high-order modulation in the high frequency band. Phase noise causes phase deviations among different time-domain symbols. If the impact of phase noise is not estimated, the accuracy of data demodulation will be greatly reduced. In order to estimate the phase deviation among different time-domain symbols, a second type of reference signal can be used by the receiving side for phase noise compensation. In general, the requirement on time-domain density of the second type of reference signal is higher than that of the conventional data demodulation reference signal, while in the frequency-domain, since the phase deviation caused by the phase noise is similar in the same time-domain symbol, the frequency-domain density of the second type of reference signal does not have to be as high as the traditional DM-RS.

When the base station practically transmits data using multiple antenna panels, if the multiple panels are connected to the same crystal oscillator, the multiple panels connected to the same crystal oscillator only need one port to transmit the second type of reference signal to compensate for the influence of phase noise since the phase deviations between the different time-domain symbols caused by the same crystal oscillator are the same. That is, since the phase noise deviation estimated using the second type of reference signal can be applied to all ports of the first type of reference signal, it is sufficient to configure the multiple ports of the first type of reference signal with one port of the second type of reference signal. Whereas transmitting the demodulation reference signal, if multiple DM-RS ports correspond to different crystal oscillators, in order to estimate the phase deviations of each DM-RS port in different time-domain symbols, each of the first type of DM-RS ports is required to have a corresponding port of the second type of reference signal. Therefore, in general, the number of ports of the second type of reference signal are less than or equal to the number of ports of the first type of reference signal. Moreover, the association between the ports of the first type of reference signal and the ports of the second type of reference signal is required to be known to the user.

Figure 8:
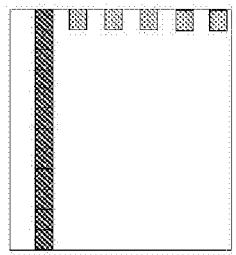
FIG. 8 is a schematic diagram of a first type of reference signal and a second type of reference signal provided according to an embodiment of the present disclosure.

FIG. 8 is a schematic diagram of a first type of reference signal and a second type of reference signal according to an embodiment of the present disclosure. As shown in FIG. 8, the first type of reference signal are used for conventional data demodulation, and the second type of reference signal are mainly used to compensate for the influence of phase noise, and its time-domain density is high.

The PN sequence described in this application refers to the sequence adopted by the LTE downlink CRS and DMRS, and the ZC sequence refers to the sequence adopted by the LTE uplink DMRS and SRS.

A first type of reference signal and a second type of reference signal are generated, the first communication node or the second communication node transmits the first type of reference signal and the second type of reference signal, characteristics of the first type of reference signal determine characteristics of the second type of reference signal, or a specific characteristics of the first type of reference signal are the same as a specific characteristics of the second type of reference signal, and the second type of reference signal are transmitted or not transmitted.

And, the characteristics of the first type of reference signal and the second type of reference signal include at least one of: a pattern of reference signals, the number of ports, a port number, a length of orthogonal code, an orthogonal code sequence, an index of the orthogonal code sequence, a transmission resource, a parameter used for generating a sequence, a generation manner of a sequence, a sequence type used, a waveform used or a transmission mode used.

It may be also possible that a part of characteristics of the first type of reference signal determines a part of the characteristics of the second type of reference signal, rather than all of the characteristics. In addition, in this dependency, the characteristics of the first type of reference signal and the characteristics of the second type of reference signal may be different.

It is understood from another view that the base station utilizes a signaling notifying the characteristics of the first type of reference signal to also notify characteristics parameter of the second type of reference signal at the same time. In other words, certain characteristics of the first type of reference signal and certain characteristics of the second type of reference signal share the same set of configuration parameters, and the characteristics of the first type of reference signal and the characteristics of the second type of reference signal are not necessarily the same.

The second type of reference signal may be absent, be configured, or not transmitted. In the absence of the second type of reference signal, there may be no characteristic dependency between the first type of reference signal and the second type of reference signal described.

The pattern of the reference signal described in the present application includes the position of the reference signal, the time-domain density, and the frequency-domain density.

EXAMPLE 1

When the characteristic of the first type of reference signal includes a pattern of the reference signal, the pattern of the first type of reference signal determines the pattern of the second type of reference signal.

Figure 9:
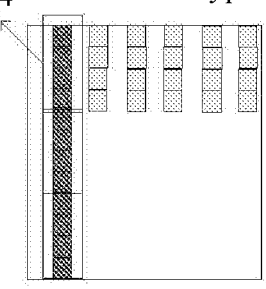
FIG. 9 is a schematic diagram of patterns of a first type of reference signal and a second type of reference signal in the frequency-domain according to an embodiment of the present disclosure.
Figure 9:
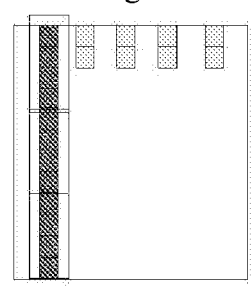
Figure 9:
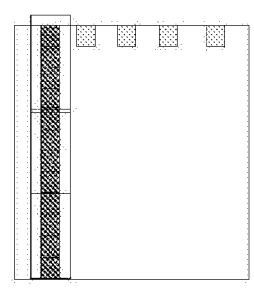
Figure 9:
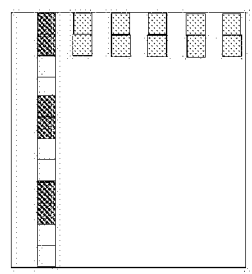
Figure 9:
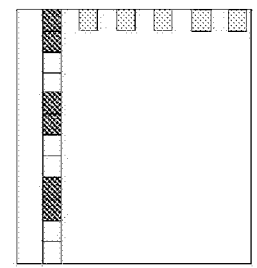

The pattern of the first type of reference signal determines the pattern or possible pattern of the second type of reference signal. That is to say, the pattern of the second type of reference signal may be partially or completely dependent on the pattern of the first type of reference signal. FIG. 9 is a schematic diagram of patterns of a first type of reference signal and a second type of reference signal in a frequency-domain according to an embodiment of the present disclosure. As shown in FIG. 9, if the pattern of the first type of reference signal in the frequency-domain is shown as pattern 'a' in the first row of FIG. 9, that is, it has a relatively high frequency-domain density, the possible pattern of the second type of reference signal in the frequency-domain is shown as patterns 'a', and 'c' in FIG. 9, i.e., the maximum frequency-domain density of multiple patterns is also relatively high. If the pattern of the first type of reference signal in the frequency-domain is shown as pattern 'd' in the second row of FIG. 9, that is, it has a relatively low frequency-domain density, the possible pattern of the second type of reference signal in the frequency-domain is shown as patterns 'd' and 'e' in FIG. 9, that is, the maximum frequency-domain density of multiple patterns is also relatively low.

Furthermore, the frequency-domain density of the first type of reference signal determines the frequency-domain density of the second type of reference signal or the maximum frequency-domain density of the second type of reference signal, where the frequency-domain density refers to the number of subcarriers included in one PRB. For example, when the first type of reference signal are transmitted at M1 subcarriers within one PRB, then the second type of reference signal may be transmitted at at most L1 subcarriers in one PRB, and if the first type of reference signal transmits M2 subcarriers in one PRB, the second type of reference signal transmits at most L2 subcarriers in one PRB. If M1>M2, then L1>L2, and if M1<M2, then L1<L2.

It is to be noted that the pattern of the second type of reference signal does not necessarily depend entirely on the pattern of the first type of reference signal. For the second type of reference signal, the base station can further configure for the user a signaling related to the pattern of the second type of reference signal. That is to say, the pattern of the second type of reference signal can be determined according to the pattern of the first type of reference signal and another signaling. For example, in FIG. 9, if the pattern of the first type of reference signal in the frequency-domain is shown as pattern 'a' in the first row of FIG. 9, that is, the frequency-domain density is high, then the possible pattern of the second type of reference signal in the frequency-domain is shown as patterns 'a', and 'c' of FIG. 9, and the user can determine which one of the patterns 'a', 'b', and 'c' is the pattern of the second type of reference signal according to the other signaling.

In summary, the base station may implicitly notify the information of the pattern of the second type of reference signal by using the signaling which notifies the pattern of the first type of reference signal.

EXAMPLE 2

When the characteristic of the first type of reference signal includes a pattern of the reference signal and a length of orthogonal codes, the pattern of the first type of reference signal and the length of orthogonal code determine the pattern of the second type of reference signal and the length of orthogonal codes.

The pattern of the first type of reference signal and the length of orthogonal code completely determine or partially determine the pattern of the second type of reference signal and the length of orthogonal code. That is to say, the pattern of the second type of reference signal and the length of orthogonal code may be partially determined by the pattern of the first type of reference signal. As shown in FIG. 9, if the pattern of the first type of reference signal in the frequency-domain is shown as pattern 'a' in the first row of FIG. 9, i.e., the frequency-domain density is high, an orthogonal code with a length of 4 is used to multiplex at most 4 ports on four consecutive subcarriers. Then, the possible patterns of the second type of reference signal in the frequency-domain are shown as patterns 'a', 'b', and 'c' in FIG. 9, the length of orthogonal code corresponding to pattern 'a' in FIG. 9 is 4, the length of orthogonal code corresponding to pattern 'b' in FIG. 9 is 2, and the length of the orthogonal code corresponding to pattern 'c' in FIG. 9 is 1, i.e., the orthogonal multiplexing is not performed in the frequency-domain. It can be seen that the pattern of the second type of reference signal and the length of orthogonal code do not necessarily depend entirely on the pattern of the first type of reference signal. That is to say, the base station can notify the user of the pattern of the second type of reference signal and the length of orthogonal code, by the signaling that notifies the pattern of the first type of reference signal and the length of orthogonal code, and by other additional signaling. Also, in the example of 'a', and 'c' in FIG. 9, if the base station notifies the user that the length of orthogonal code is 2 by the other signaling, the user can determine that the pattern of the second type of reference signal is pattern 'b' in FIG. 9.

The orthogonal code refers to an OCC (orthogonal cover code) sequence, but is not limited to an OCC orthogonal sequence. Of course, it can also refer to other orthogonal sequences, such as DFT orthogonal sequences.

Figure 10:
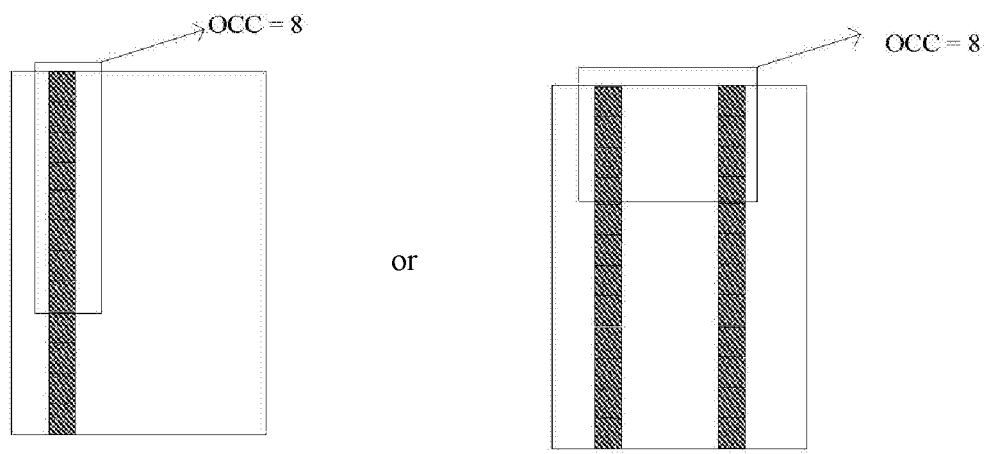
FIG. 10 is a schematic diagram of a reference signal using a code division manner according to Example 2 of the present disclosure.

FIG. 10 is a schematic diagram of reference signal using a code division manner according to Example 2 of the present disclosure. As shown in FIG. 10, the reference signal uses a code division manner, and the length of orthogonal code is equal to 8. In this example, the orthogonal code with a length of 8 occupies 8 REs. If the OCC orthogonal sequence is used, the reference signal of at most 8 orthogonal ports can be multiplexed, and the orthogonal sequences used by the 8 orthogonal ports are Q1, Q2, Q3, Q4, Q5, Q6, Q7 and Q8 respectively, as shown in Table 1.

TABLE 1

| Sequence of OCC = 8 | | | | | | | |
|---|---|---|---|---|---|---|---|
| Q1 | Q2 | Q3 | Q4 | Q5 | Q6 | Q7 | Q8 |
| 1 | 1 | 1 | 1 | 1 | 1 | 1 | 1 |
| 1 | 1 | 1 | 1 | −1 | −1 | −1 | −1 |
| 1 | 1 | −1 | −1 | 1 | 1 | −1 | −1 |
| 1 | 1 | −1 | −1 | −1 | −1 | 1 | 1 |
| 1 | −1 | 1 | −1 | 1 | −1 | 1 | −1 |
| 1 | −1 | 1 | −1 | −1 | 1 | −1 | 1 |
| 1 | −1 | −1 | 1 | 1 | −1 | −1 | 1 |
| 1 | −1 | −1 | 1 | −1 | 1 | 1 | −1 |

If the reference signal uses OCC orthogonal sequences with a length of 4, denoted as G1, G2, G3, G4, respectively, as shown in Table 2, the OCC sequences with the length of 4 can be used to code-division multiplex at most four ports of reference signal on four REs.

TABLE 2

| Sequence of OCC = 4 | | | |
|---|---|---|---|
| G1 | G2 | G3 | G4 |
| 1 | 1 | 1 | 1 |
| 1 | 1 | −1 | −1 |
| 1 | −1 | 1 | −1 |
| 1 | −1 | −1 | 1 |

If the reference signal uses OCC orthogonal sequences with a length of 2, denoted as P1, P2, respectively, as shown in Table 3, the OCC sequences with the length of 2 can be used to code-division multiplex at most two ports of reference signal on two REs.

TABLE 3

| Sequence of OCC = 2 | |
|---|---|
| P1 | P2 |
| 1 | 1 |
| 1 | −1 |

If the length of OCC is equal to 1, the orthogonal code is not used in one RE. Thus, the code corresponding to the single port can be considered as P0=[1].

When the base station allocates to the user the reference signal of X ports, then each port corresponds to X sequences. For example, if the length of the orthogonal sequence is 2, the two ports of reference signal occupy 2 orthogonal sequences, such as P1 and P2. If the user is only configured with 1 port, there is only one orthogonal sequence, such as P1 or P2. In the case of multiple ports, the base station typically uses a configuration index to notify the orthogonal sequences of multiple ports without notifying each port respectively. Like LTE, for a closed-loop spatially multiplexed data demodulation reference signal, one port corresponds to one data layer.

Generally, since different ports correspond to different sequences of orthogonal codes and different lengths of orthogonal codes, it is assumed in this application that the port numbers of the first type of reference signal corresponding to P0, P1, P2, G1, G2, G3, G4, Q1, Q2, Q3, Q4, Q5, Q6, Q7, Q8 are ports #M0, #M1, #M2, #M3, . . . #M12, respectively. If there is no sequence such as OCC with a length of 8, the corresponding port does not exist either. Assuming that the port numbers of the second type of reference signal corresponding to P0, P1, P2, G1, G2, G3, G4, Q1, Q2, Q3, Q4, Q5, Q6, Q7, and Q8 are ports #N0, #N1, #N2,#N3 . . . #N12, respectively; if there is no sequence such as OCC with a length of 8, the corresponding port does not exist either.

Therefore, the pattern of the first type of reference signal and the orthogonal code determine the pattern of the second type of reference signal and the length of orthogonal code. That is so say, the pattern of the first type of reference signal and the port number determine the possible pattern of the second type of reference signal and the port number. As shown in FIG. 9, if the pattern of the first type of reference signal in the frequency-domain is shown as pattern 'a' in the first row of FIG. 9, i.e., the frequency-domain density is high, and if the orthogonal code with a length of 4 is used on four consecutive subcarriers to multiplex at most 4 ports, the possible patterns of the second type of reference signal in the frequency-domain are shown as patterns 'a', and 'c' of FIG. 9, the length of the orthogonal code corresponding to 'a' of FIG. 9 is 4, and the possible port number includes #N3, #N4, #N5, #N6. The length of orthogonal code corresponding to 'b' of FIG. 9 is 2, the possible port number includes #N1, #N2. The length of the orthogonal code corresponding to 'c' of FIG. 9 is 1, that is, orthogonal multiplexing is not performed in the frequency-domain, thus the possible port number corresponds to port #N0.

Because the pattern of the orthogonal code of the first type of reference signal determines a possible pattern of the second type of reference signal and the length of orthogonal code, if the first communication node notifies, by a signaling, the second communication node of the length of the orthogonal sequence used by the second type of reference signal, then the second communication node can determine the pattern of the second type of reference signal and the orthogonal sequence used. For example, one port is assigned to the first type of reference signal and the port number is #M3, i.e., the length of the orthogonal sequence is 4 and the orthogonal sequence is G1. Furthermore, if the base station notifies the user that the length of the second type of reference signal is also 4, the orthogonal code sequence of the second type of reference signal can also be defaulted as G1, and the port used will be #N3. If the two types of reference signals use the same pre-coding manner, #N3 can be considered as #M3.

EXAMPLE 3

When the characteristic of the first type of reference signal includes the number of ports of reference signal, the number of ports of the first type of reference signal determines the number of ports of the second type of reference signal.

The number of ports of the first type of reference signal determines the number of ports of the second type of reference signal. That is, the number of ports of the first type of reference signal is an integer multiple of the number of ports of the second type of reference signal. For example, if the number of ports of the first type of reference signal is 8, the possible number of ports of the second type of reference signal possibly is 8, 4, 2 and 1. For example, if the number of ports of the first type of reference signal is 4, then the possible number of ports of the second type of reference signal is 4, 2, and 1.

A first communication node notifies a second communication node of the maximum number of ports of the second type of reference signal by a signaling.

The base station can semi-statically configure the user with the maximum number of ports of the second type of reference signal through a high layer signaling, and then the base station can indicate the actual number of ports of the second type of reference signal by the a signaling indicating the number of ports of the first type of reference signal, and by the maximum number of ports of the second type of reference signal, which is configured by the high layer signaling. For example, the maximum number of ports of the second type of reference signal configured by the base station to the user through the high layer signaling is L2, if the number L1 of ports of the first type of reference signal, which that the base station notifies the user by the dynamic DCI signaling, is greater than or equal to L2, the number of ports of the second type of reference signal is L2. The number of ports of the first type of reference signal L1 is divided into L2 groups, and each group corresponds to one port of the second type of reference signal. If the number of ports of the first type of reference signal configured to the user by the base station through DCI signaling meets L1<L2, the number of ports of the second type of reference signal shall be L1. For example, the maximum number of ports of the second type of reference signal configured by the base station to the user through the high layer signaling is 2, the number of ports of the first type of reference signal configured by the base station to the user through the dynamic signaling is 4, and the actual number of the ports of the second type of reference signal is 2; while if the number of ports of the first type of reference signal configured by the base station to the user through the dynamic signaling is 1, and the actual number of the ports of the second type of reference signal is 1.

The actual number of ports of the second type of reference signal is the minimum value of the maximum number of ports that is configured by the high layers and the number of the ports of the first type of reference signal. If the number L1 of ports of the first type of reference signal is greater than the number L2 of ports of the second type of reference signal, the L1 ports are divided into L2 groups, and the number of ports included in each group may not be equal. In each group, the ports of first type of reference signal correspond to the same port of the second type of reference signal.

It is to be noted that, in the present disclosure, the base station may also notify the maximum number of ports of the second type of reference signal by using another signaling.

EXAMPLE 4

The pattern, the number of ports, the port number, the length of orthogonal code, the orthogonal code sequence of the first type of reference signal completely or partially determine the number of ports, the orthogonal code sequence, the pattern, the port number of the second type of reference signal and the association between the first type of reference signal and the second type of reference signal.

In the case where the above parameters of the first type of reference signal partially determine those of the second type of reference signal, the pattern, the number of ports, the port number, the length of orthogonal code, the orthogonal code sequence of the second type of reference signal, and an association with the port of the first type of reference signal can be fully determined by the base station notifying information about the pattern, the number of ports, the port number, information of the orthogonal code sequence of the first type of reference signal, etc.

For example, after the base station uses the signaling to notify the user of the pattern A1, the number L1 of ports, and the length LO1 of orthogonal sequence of the first type of reference signal, and orthogonal sequence indexing O1, the user can determine, in combination with the maximum number L2 of ports of the second type of reference signal that the base station configured to the user, the pattern A2, the number of ports L2, the orthogonal sequence O2 of the second type of reference signal, and the corresponding length of the orthogonal sequence based on the information. For example, when the pattern of the first type of reference signal is shown as pattern 'a' in FIG. 9 and L1=4, the pattern of the second type of reference signal is shown as patterns 'a', and 'c' in FIG. 9, the maximum number of ports of the second type of reference signal is 2, and then the actual number of ports of the second type of reference signal actually configured to the user is 2. The pattern is shown as pattern 'b' in FIG. 9. Since there are only two subcarriers in the frequency-domain, the orthogonal sequence of the two ports is [1 1][1 −1]. The number L1 of ports of the first type of reference signal are divided into L2 groups, and each group corresponds to one of ports of the second type of reference signal.

In other words, the pattern, the number of ports, the port number, the length of orthogonal code, the orthogonal code sequence of the first type of reference signal have an association relationship with the number of ports, the orthogonal code sequence, the pattern, and the port number of the second type of reference signal. The base station does not need to use two independent signaling sets to notify the parameter of the first type of reference signal and the parameter of the second type of reference signal.

That is to say, the base station can use combined signalings to notify the number of ports, the port number, the orthogonal code index, or the pattern of the first type of reference signal and the second type of reference signal, and the association between the two types of reference signals. In other words, the base station can use some signalings to indicate both the information of the first type of reference signal and the information of the second type of reference signal.

Figure 11:
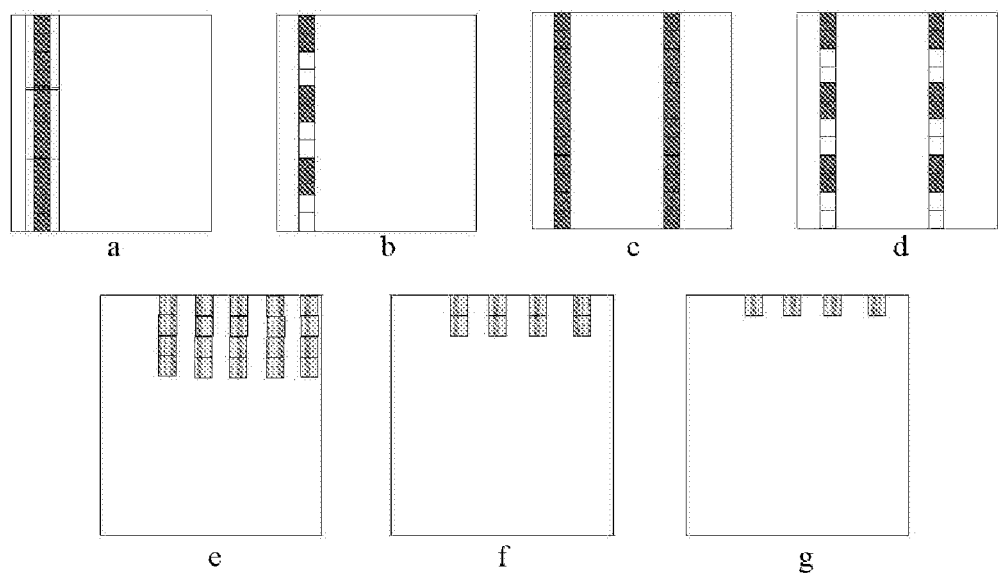
FIG. 11 is a schematic diagram of patterns of a first type of reference signal and a second type of reference signal provided according to Example 4 of the present disclosure.

FIG. 11 is a schematic diagram of patterns of a first type of reference signal and a second type of reference signal according to Example 4 of the present disclosure. As shown in FIG. 11, it is assumed that there are four patterns of the first type of reference signal, and in FIG.

11, 'a' can support at most 4 ports. In the frequency-domain, 4 ports are multiplexed by means of orthogonal codes on 4 consecutive REs. In FIG. 11, 'b' can support at most 2 ports, and in the frequency-domain, 2 ports are multiplexed by means of orthogonal codes on 2 consecutive REs. In FIG. 11, 'c' can support at most 8 ports, and 4 ports in the frequency-domain are multiplexed by means of orthogonal codes on 4 consecutive REs. Because there are 2 columns of reference signals, two orthogonal ports can be multiplexed in the time-domain in the time division or code division manner.

In FIG. 11, 'd' can support at most four orthogonal ports, two orthogonal ports are multiplexed in the frequency-domain, and since there are two columns of reference signals, two orthogonal ports can be multiplexed in the time-domain in the time division or code division manner.

It is to be noted that for 'c' and 'd' in FIG. 11, four ports can also be supported. That is, OCC multiplexing is not performed in the time-domain. It is also possible to select two consecutive ports to be orthogonalized in the frequency-domain by means use the OCC, and also to be orthogonalized in the time-domain, which thus will support four ports as well. In other words, the pattern supporting the maximum of 8 ports also supports 1, 2, and 4 ports.

For the patterns 'a' and 'c' of the first type of reference signal, the possible patterns of the second type of reference signal include 'e', 'f', and 'g' in FIG. 11; and for the patterns 'b' and 'd' of the first type of reference signal, the pattern of the second type of reference signal may be 'f', and 'g'.

The joint notification of the pattern, the number of ports, the orthogonal sequence, etc., of the first type of reference signal and the second type of reference signal can save signaling overhead. It is assumed that the high layer signaling informs that the second type of reference signal of the maximum of ports is 4. Table 4 lists the case where the first type of reference signal use 8-port and 4-port reference signals. It can be seen that the information of the first type of reference signal is notified by the four indexes (2 bits) and in the meanwhile the information of the second type of reference signal are also notified.

TABLE 4

| | The first type of reference signal | | | The second type of reference signal | | |
|---|---|---|---|---|---|---|
| Index | The number of ports | Pattern | orthogonal code sequence | The number of ports | Pattern | orthogonal code sequence |
| 0 | 8 | c | Orthogonal sequence G0, G1, G2, and G3 used in the frequency-domain (in the frequency-domain, orthogonal codes with a length of 4 are used for 4 consecutive REs) P0 and P1 in the time-domain | 4 | f | G0, G1, G2, and G3 in the frequency-domain |
| 1 | 4 | a | G0, G1, G2, and G3 in the frequency-domain | 4 | f | G0, G1, G2, and G3 in the frequency-domain |
| 2 | | d | P0 and P1 in the frequency-domain, P0 and P1 in the time-domain, two columns of reference signals in the time-domain use | | | |

TABLE 4-continued

| | The first type of reference signal | | | The second type of reference signal | | |
|---|---|---|---|---|---|---|
| Index | The number of ports | Pattern | orthogonal code sequence | The number of ports | Pattern | orthogonal code sequence |
| | | | orthogonal codes with a length of 2, or two consecutive REs in the frequency-domain use orthogonal codes with a length of 2 | | | |
| 3 | | c | G0, G1, G2, and G3 in the frequency-domain | | | |
| 4 | | | P0 and P1 in the frequency-domain, and P0 and P1 in the time-domain | | | |

EXAMPLE 5

Figure 12:
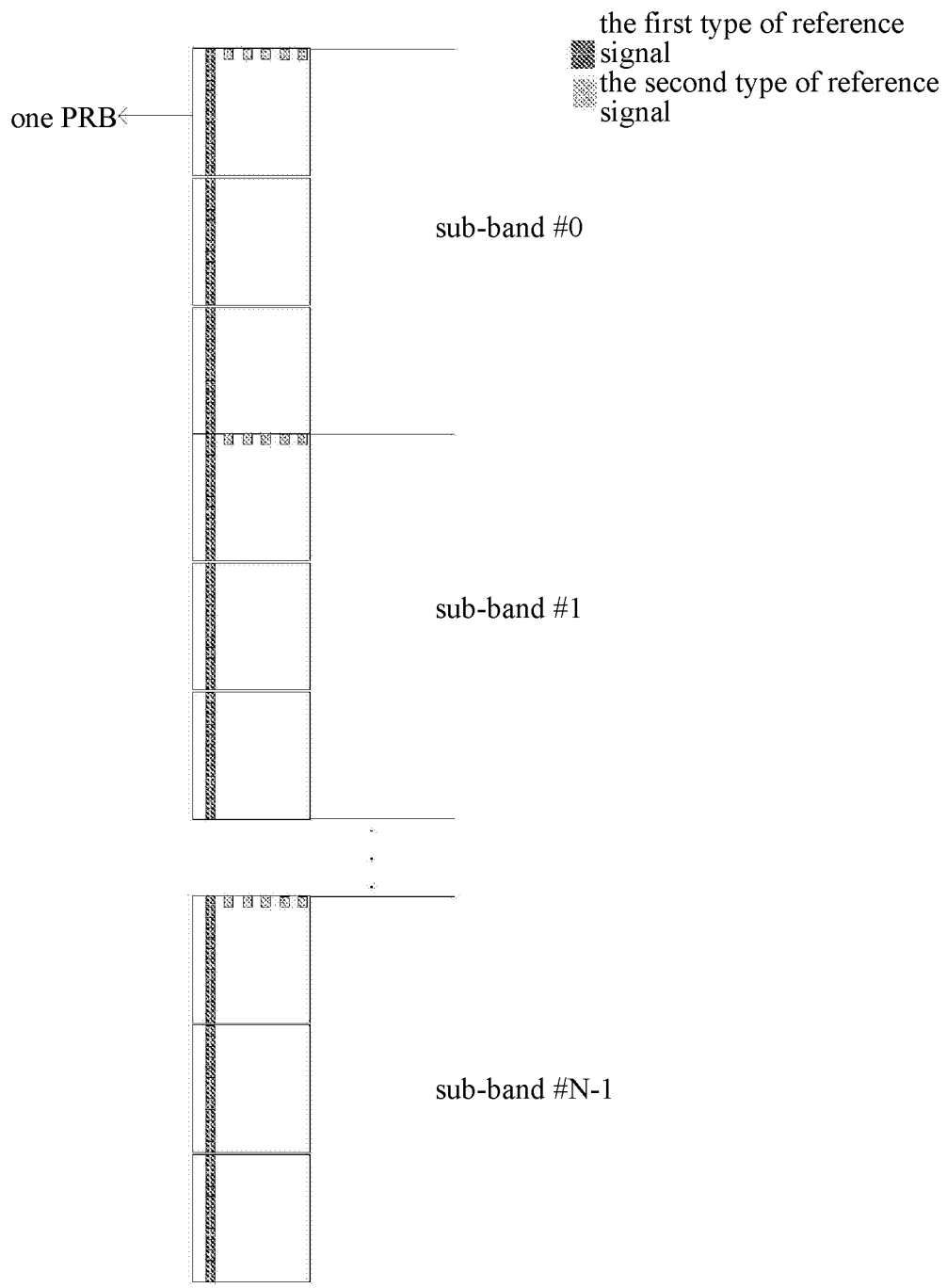
FIG. 12 is a schematic diagram of positions in which a first type of reference signal and a second type of reference signal provided are located in the frequency-domain according to Example 5 of the present disclosure.

When the parameter of the first type of reference signal and the parameter of the second type of reference signal include the sequence generation manner used by the signal, the sequence generation manner of the first type of reference signal determines the sequence generation manner of the second type of reference signal. If the sequence generation manner of the first type of reference signal are the same as the LTE downlink DMRS, i.e., some PN sequences are generated on the entire bandwidth, then the user can know the sequence of the first type of reference signal according to the allocated time-frequency-domain resource location. For example, FIG. 12 is a schematic diagram of positions of a first type of reference signal and a second type of reference signal in a frequency-domain according to Example 5 of the present disclosure. As shown in FIG. 12, it contains N sub-bands on the system bandwidth, and then the length of the first generated reference signal is at least the same as the size of the system bandwidth. That is to say, there will be a corresponding sequence generated in each sub-band. When some of the resources, such as the first sub-band, are scheduled for the user, the sequence of the first type of reference signal is then a sequence corresponding to the first sub-band, taken from the sequence of the length for the entire system bandwidth. After the sequence of the first type of reference signal is determined, the sequence of the second type of reference signal is determined accordingly, which may be for example the sequence of the first type of reference signal in the corresponding frequency-domain positions.

If the first type of reference signal is a ZC sequence and a complete ZC sequence is for each sub-band, then the second type of reference signal is also a ZC sequence, and it may be a copy of a sequence of the first type of reference signal in the corresponding frequency-domain RE position. Thus, the frequency-domain RE occupied by the second type of reference signal is required to be a subset of the frequency-domain RE occupied by the first type of reference signal. That is to say, if the first type of reference signal is not transmitted on some frequency-domain REs, these frequency-domain REs will not transmit the second type of reference signal either. The frequency-domain RE refers to a subcarrier.

When the characteristics of the first type of reference signal and the second type of reference signal include the type of the sequence, the type of the first type of reference signal determines the type of sequence of the second type of reference signal. Similarly, for example, if the first type of reference signal is a ZC sequence, the second type of reference signal is also a ZC sequence; if the first type of reference signal is a PN sequence, the second type of reference signal is also a PN sequence.

When the characteristics of the first type of reference signal and the second type of reference signal include the generated waveform, the waveform of the first type of reference signal determines the waveform of the second type of reference signal. For example, if the first type of reference signal uses OFDM, then the second type of reference signal also use OFDM. If the first type of reference signal use a single-carrier OFDMA, i.e., DFT-S-OFDMA, then the second type of reference signal also use the same waveform.

When the characteristics of the first type of reference signal and the second type of reference signal include the transmission mode used, the transmission mode used by the first type of reference signal determines the transmission mode used by the second type of reference signal. For example, if they are all single ports, the first type of reference signal and the second type of reference signal are pre-coded in the same way. That is, the same port may be used. For another example, in a case of two ports M11 and M12 for the first type of reference signal and only one port N2 for the second type of reference signal, the pre-coding mode of the second type of reference signal and the pre-coding mode of the first port of the first type of reference signal are the same. Alternatively, N2 and M11 are the same port.

Figure 13:
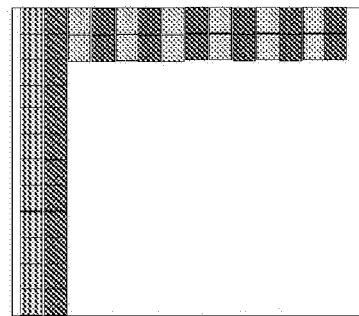
FIG. 13 is a schematic diagram of time division multiplexing among groups of a first type of reference signal and a second type of reference signal according to Example 5 of the present disclosure.

The transmission mode in which the reference signal is transmitted may also represent a multiple access mode. For example, if the first type of reference signal are time-divided, it determines that the second type of reference signal are also time-divided. FIG. 13 is a schematic diagram of time division multiplexing among groups of a first type of reference signal and a second type of reference signal according to Example 5 of the present disclosure. As shown in FIG. 13, the multiple ports of the first type of reference signal are divided into two port groups in a time division manner, and a first port group is located on the first time-domain symbol and a second port group of is located on the second time-domain symbol, in the TDM manner. If the second type of reference signal also have two port groups, the first port group of the second type of reference signal corresponds to the first port group of the first type of reference signal, and the second port group of the second type of reference signal corresponds to the second port group of the first type of reference signal. Therefore, the time division manner among port groups of the first type of reference signal determines the time division manner of the second type of reference signal.

When the characteristics of the first type of reference signal and the second type of reference signal contain parameter used in generating the sequence, the parameter used by the first type of reference signal determine the parameter used by the second type of reference signal. For example, the scrambling sequences used by the first type of reference signal and the second type of reference signal are the same. That is, the RNTIs are the same, and/or the nSCIDs are the same, or the pseudo-random sequences are the same. For another example, the orthogonal sequence indexes notifying the first type of reference signal are the same, the orthogonal sequences of the first type of reference signal and the second type of reference signal can be determined with the same orthogonal sequence index without any additional signaling. Other signaling, such as RRC signaling, MAC signaling, etc., can simultaneously indicate the parameter used by the first type of reference signal and the second type of reference. That is to say, some parameter used in the first type of reference signal and the second type of reference signal can be shared without notifying it individually.

When the number of ports of the second type of reference signal is smaller than the number of ports of the first type of reference signal, the ports of the second type of reference signal use the transmission mode for N ports of the first type of reference signal when transmitting the second type of reference signal, where N is an integer greater than 1.

The transmission mode described refers to the pre-coding mode. As shown in the pattern 'c' of FIG. 9, if four (N=4) ports are used for the first type of reference signal and one port is used for the second type of reference signal, the pre-coding mode used in transmitting the second type of reference signal is the sum of those for the N ports of the first type of reference signal. For example, the four ports of the first type of reference signal are M1, M2, M3 and M4, respectively, and the practical ports used in transmitting the second type of reference signal transmit the sum of the data sent by the ports M1, M2, M3 and M4.

EXAMPLE 6

The transmission resource of the first type of reference signal determines the transmission resource of the second type of reference signal.

The transmission resource includes at least one of: transmission bandwidth, transmission location, time-domain density, or frequency-domain density.

As shown in FIG. 13, when the transmission resource of the first type of reference signal includes time-domain location, the time-domain location of the first type of reference signal determines the time-domain location of the second type of reference signal. As shown in FIG. 13, multiple ports of the first type of reference signal are divided into two port groups in a time division manner, and a first port group is located on the first time-domain symbol and a second port group of is located on the second time-domain symbol, in the TDM manner. If the second type of reference signal also have two port groups, the first port group of the second type of reference signal corresponds to the first port group of the first type of reference signal, the second port group of the second type of reference signal corresponds to the second port group of the first type of reference signal. Therefore, the time division manner among port groups of the first type of reference signal determines the time division manner of the second type of reference signal. And, a time-domain interval between the first port group of the second type of reference signal and the first port group of the first type of reference signal is equal to a time-domain interval between the second port group of the second type of reference signal and the second port group of the first type of reference signal. In other words, since the time-domain position of the port group 1 of the first type of reference signal is earlier than that of the port group 2 of the first type of reference signal, it determines that the first time-domain symbol of the port group 1 of the second type of reference signal is earlier than the first time-domain symbol of port group 2 of the second type of reference signal.

The transmission resource of the first type of reference signal determines the transmission resource of the second type of reference signal. And, the first communication node notifies the second communication node of the potential location of the second type of reference signal in a predefined manner or in signaling configuration manner.

The transmission resource mainly refers to the bandwidth for transmission and the resource location for transmission. That is to say, the index indication for frequency-domain resource allocated by the base station to the first type of reference signal (just like that in LTE the frequency-domain resource of the first type of reference signal being the same as the frequency-domain resources of the data allocation) may indicate one or more sub-bands or may indicate one or more PRBs. The base station may notify the sub-band sequence number or the PRB numbers.

The potential location of the second type of reference signal, which is predefined or configured by a signaling, means that the base station notifies, in a pre-definition manner or by a high layer signaling, or using a high layer signaling combined with the MAC layer CE, the user that the entire transmission bandwidth or the transmission bandwidth that the user can support is divided into several sub-bands and for each sub-band, the predefined manner or high layer signaling configuration or a high layer signaling combined with the MAC layer CE further notifies the user that a certain one or M resource blocks of the each sub-band are used to transmit the second type of reference signal. In other words, in each sub-band, there is one potential PRB that can be used to transmit the second type of reference signal, while the other PRBs in the sub-band are not used to transmit the second type of reference signal. In this way, even in multi-user scheduling, the second type of reference signal of different users will be concentrated in a specific PRB of each sub-band.

If the base station uses a dynamic signaling notifies, in the DCI, the user of the number of sub-bands occupied by the first type of reference signal and the sub-band number, the user may obtain the transmission bandwidth and transmission resource location of the second type of reference signal according to the signaling configuring the number of sub-bands occupied by the first type of reference signal and the numbers as well as the potential location of the second type of reference signal. In general, the division of sub-bands and which PRBs in the sub-bands are used to transmit the second type of reference signal are cell level information. It does not exclude the case where each user has a different division manner.

As shown in FIG. 12, the entire transmission bandwidth is divided into N sub-bands, and each sub-band includes several PRBs, for example, three PRBs. Only one PRB in each sub-band contains a second type of reference signal. If the base station informs, by a signaling, the user that the allocated data transmission resource is sub-bands #0, and #1, the corresponding first type of reference signal (data demodulation reference signal) is transmitted on the sub-band #0, and #1. The base station also knows, by this signaling, that the second type of reference signal are transmitted on sub-band #0 and sub-band #1 and on the first PRB of each sub-band. The sub-bands can be divided at the cell level. That is, division manners for all users are the same, or they are related to the system bandwidth and/or sub-carrier spacing. For example, for a cell with a system bandwidth of 10M, every six PRBs form one sub-band. For a system bandwidth of 20M, every 12 PRBs form one sub-band. Thus, positions for transmitting the second type of reference signal are the same for all users.

Of course, density configurations in the frequency-domain may be different for different users. For example, the entire transmission bandwidth is divided into N sub-bands, and each sub-band includes several PRBs, for example, three PRBs. There is only one PRB potentially in each sub-band containing a second type of reference signal. The base station can configure the user U0 by the high layer signaling that there is only one PRB for transmitting the second type of reference signal in every two sub-bands. Whereas for the user U1, there is one PRB for transmitting the second type of reference signal in each sub-band. In other words, the length of the sub-band division can be different for different users. For example, as shown in FIG. 12, the base station configures the user U0 and U1 with the data transmission resources of the same sub-bands #0 and #1, the U0 transmits or receives the second type of reference signal only on the first PRB of the first sub-band, whereas the U1 transmits or receives the second type of reference signal on the first PRB of both the sub-band #0 and sub-band #1.

The second type of reference signal described in this embodiment includes a second type of reference signal with zero power. For example, as shown in FIG. 12, if two users U0 and U1 perform multi-user scheduling on sub-band #0, the sub-band number assigned to the U0 is #0, and #1, and a second type of reference signal with non-zero power are required to estimate the phase noise. Whereas the U1 is assigned with sub-band #0, and a second type of reference signal with non-zero power are not required to estimate phase noise. But if U1 transmits data on a RE corresponding to the second type of reference signal, which RE is in the first PRB on sub-band #0, it will cause an interference on the second type of reference signal on the sub-band #0 of U0, which will in turn induce a decrease in accuracy for estimation of the phase noise by U0. Therefore, it is better to allocate U1 a second type of reference signal with zero power in sub-band #0. Whether the second type of reference signal has a zero power may require be informed to the user by additional signaling.

Figure 14:
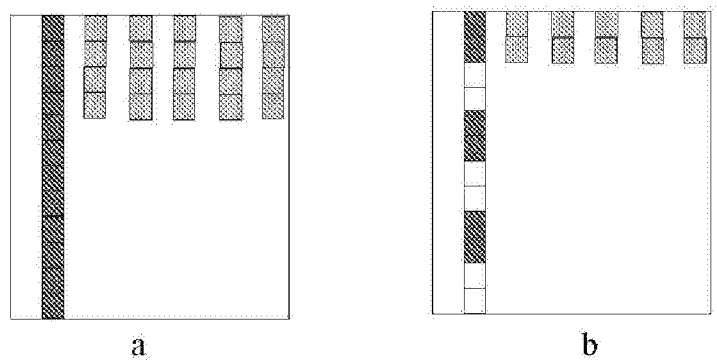
FIG. 14 is a schematic diagram showing the relationship between a first type of reference signal and a second type of reference signal provided according to Example 6 of the present disclosure.

For another example, when the transmission resource indicates the time-domain density and/or the frequency-domain density of the reference signal, the user can learn the density of the second type of reference signal by knowing the density of the first type of reference signal. FIG. 14 is a schematic diagram showing the relationship between a first type of reference signal and a second type of reference signal according to Example 6 of the present disclosure. As shown in FIG. 14, the user can use the information on the frequency-domain density of the first type of reference signal to calculate some information on the frequency-domain density of the second type of reference signal. For example, as shown in 'a' of FIG. 14, if the first type of reference signal are transmitted on all subcarriers of the entire PRB, the user's second type of reference signal occupy at most 4 subcarriers in one PRB. Further, the base station can use the dynamic signaling to notify the user whether it occupies 4 subcarriers or 2 subcarriers, or the second type of reference signal occupy 4 subcarriers constantly. If the transmission of the first type of reference signal is as shown by 'b' in FIG. 14, then the user's second type of reference signal occupies at most 2 subcarriers in one PRB. Further, the base station can use dynamic signaling to further notify the user whether it occupies 2 subcarriers or 1 subcarrier, or the second type of reference signal to occupy 2 subcarriers constantly.

EXAMPLE 7

The ports of the second type of reference signal are divided into multiple port groups, and different port groups are distinguished in time division manner.

Figure 15:
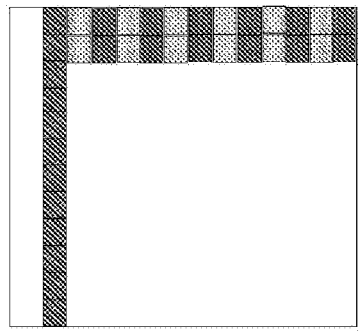
FIG. 15 is a schematic diagram of a case in which a second type of reference signal are divided into two groups according to Example 7 of the present disclosure.

For example, the second type of reference signal are divided into two groups, and then the time-domain symbols, on which the second type of reference signal are mapped, are also divided into two groups. The different groups of the second type of reference signal are mapped on different time-domain symbol groups. FIG. 15 is a schematic diagram of a second type of reference signal being divided into two groups according to Example 7 of the present disclosure. As shown in FIG. 15, the second type of reference signal are divided into two port groups, and the different port groups are mapped on the time-domain symbols in the time division manner. For example, the first type of reference signal include four ports, and the second type of reference signal corresponding thereto also include four ports, i.e., #0, #1, #2, and #3. The ports #0, and #1 form the first port group, the ports #2, and #3 form the second port group, and then these port groups are mapped to different time-domain symbol groups in the time-domain manner.

As shown in FIG. 13, when the transmission resource for the first type of reference signal includes a time-domain location, the time-domain location of the first type of reference signal determines the time-domain location of the second type of reference signal. As shown in FIG. 13, multiple ports of the first type of reference signal are divided into two groups in the time division manner, the first port group is on the first time-domain symbol, the second port group is in the second time-domain symbol, and they are multiplexed by time division (TDMed). The second type of reference signal also has two port groups, the first port group of the second type of reference signal corresponds to the first port group of the first type of reference signal, and the second port group of the second type of reference signal corresponds to the second port group of the first type of reference signal. Therefore, the manner of time division among the port groups of the first type of reference signal determines the manner of time division for the second type of reference signal. And, the time-domain interval between the first port group of the second type of reference signal and the first port group of the first type of reference signal and the time-domain interval between the second port group of the second type of reference signal and the second port group of the first type of reference signal are equal. In other words, since the time-domain position of the port group 1 of the first type of reference signal is earlier than that of the port group 2 of the first type of reference signal, it determines that the first time-domain symbol of the port group 1 of the second type of reference signal is earlier than the first time-domain symbol of port group 2 of the second type of reference signal. The different port groups of the second type of reference signal also use a time division manner.

EXAMPLE 8

The transmission resources used by the different ports of the second type of reference signal are completely different or partially different.

The transmission resource includes at least one of: transmission bandwidth, transmission location, time-domain density, or frequency-domain density.

That is to say, the transmission bandwidths for different ports or port groups are different. Some ports occupy a resource with a long bandwidth in the frequency-domain, and some ports occupy a resource with a short bandwidth in the frequency-domain. The time-domain densities and/or frequency-domain densities for different ports can be different. In addition, the occupied time-frequency-domain locations can also be different.

Figure 16:
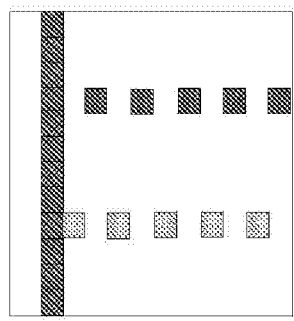
FIG. 16 is a schematic diagram of a case in which two ports of a second type of reference signal are mapped to two subcarriers respectively according to Example 8 of the present disclosure.

FIG. 16 is a schematic diagram of two ports of a second type of reference signal being mapped on two subcarriers respectively according to Example 8 of the present disclosure. As shown in FIG. 16, the second type of reference signal have two ports. For one PRB, the mapping locations of the two ports are different. The two ports of the second type of reference signal shown in FIG. 16 are respectively mapped on two subcarriers, and the time-domains are separately arranged in interleaving manner.

Figure 17:
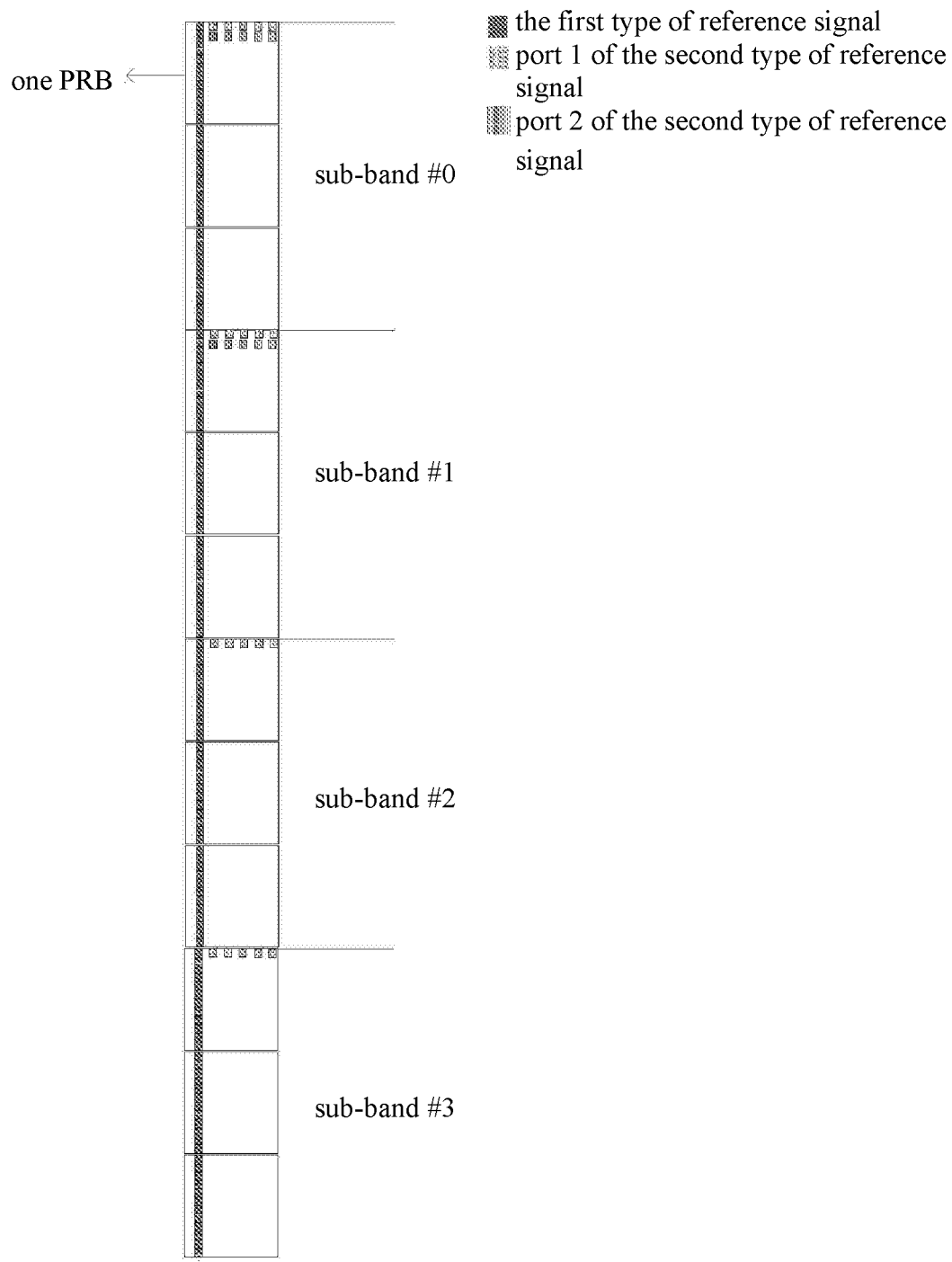
FIG. 17 is a schematic diagram of case in which transmission bandwidths of different ports of the second type of reference signal are different according to Example 8 of the present disclosure.

FIG. 17 is a schematic diagram showing different transmission bandwidths of different ports of a second type of reference signal according to Example 8 of the present disclosure. As shown in FIG. 17, the base station transmits a first type of reference signal on 16 consecutive PRBs (4 sub-bands). The second type of reference signal have two ports. The base station transmits port 1 one time every 4 PRBs (one sub-band). It can be considered that the transmission bandwidth of port 1 is also 4 sub-bands. The base station transmits port 2 only on the first two sub-bands, and it can be considered that the transmission bandwidth of port 2 is only two sub-bands. Hence, the transmission bandwidths for different ports of the second type of reference signal are different. In this case, it can be considered that the densities of the two ports of the second type of reference signal are different.

For another example, the base station transmits a first type of reference signal on 16 consecutive PRBs (4 sub-bands). The second type of reference signal have 2 ports, the base station transmits port 1 one time every 4 PRBs (one sub-band); whereas the base station transmits port 2 one time every 8 PRBs, and the density of port 1 is twice the density of port 2.

EXAMPLE 9

The orthogonal sequence of the first type of reference signal determines the orthogonal sequence of the second type of reference signal.

If the sequence types of the two types of reference signals are the same, for example, both are OCC sequences, the lengths of the orthogonal sequences of the first type of reference signal and the second type of reference signal are the same or different. That is, the orthogonal sequence of the second type of reference signal can be known by the orthogonal sequence of the first type of reference signal. In other words, the first type of reference signal and the second type of reference signal share the same orthogonal sequence index.

Figure 18:
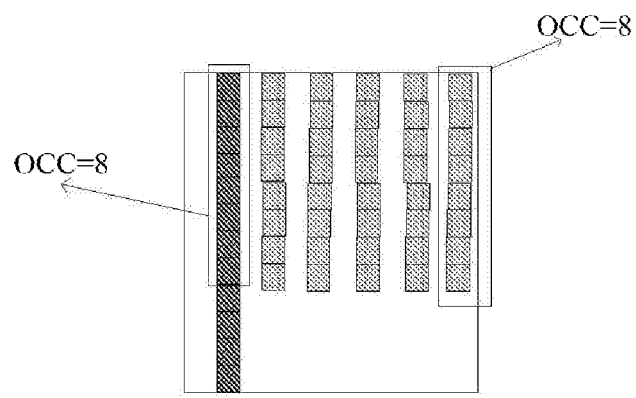
FIG. 18 is a schematic diagram of a case in which the length of orthogonal sequences used for the second type of reference signal and the length of orthogonal sequences used for the first type of reference signal are equal according to Example 9 of the present disclosure.

FIG. 18 is a schematic diagram showing a case in which the lengths of orthogonal sequences used by the second type of reference signal and the first type of reference signal are the same according to Example 9 of the present disclosure. As shown in FIG. 18, if the length of the orthogonal sequence used for the second type of reference signal and the length of the orthogonal sequence used by the first type of reference signal are equal, for example, sequences with the OCC length of 8, then the OCC sequences used by the second type of reference signal and the first type of reference signal are the same. In this example, the number of ports of the first type of reference signal is equal to the number of ports of the second type of reference signal. That is, the numbers of layers are equal. Table 5 exemplifies cases where the user uses one layer and two layers respectively. The two types of reference signals use the same sequence and the numbers of ports are also equal.

TABLE 5

| OCC index | the first type of reference signal One layer | the second type of reference signal One layer | the first type of reference signal 2 layers | the second type of reference signal 2 layers |
|---|---|---|---|---|
| 1 | Q1 | Q1 | Q1 Q2 | Q1 Q2 |
| 2 | Q2 | Q2 | Q3 Q4 | Q3 Q4 |
| 3 | Q3 | Q3 | Q5 Q6 | Q5 Q6 |
| 4 | Q4 | Q4 | Q7 Q8 | Q7 Q8 |
| 5 | Q5 | Q5 | | |
| 6 | Q6 | Q6 | | |
| 7 | Q7 | Q7 | | |
| 8 | Q8 | Q8 | | |

Figure 19:
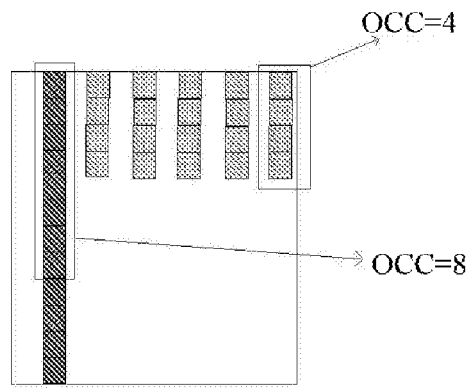
FIG. 19 is a schematic diagram of a case in which the length of sequences used for the second type of reference signal and the length of orthogonal sequences used for the first type of reference signal are not equal according to Example 9 of the present disclosure.

FIG. 19 is a schematic diagram showing that the sequence lengths used by the second type of reference signal and the first type of reference signal are unequal according to Example 9 of the present disclosure. As shown in FIG. 19, the length of the orthogonal sequence used for the second type of reference signal are not equal to the length of the orthogonal sequence used for the first type of reference signal. Since the frequency-domain density of the first type of reference signal is generally greater than the frequency-domain density of the second type of reference signal, the length of orthogonal code of the second type of reference signal may be a half, ¼ or ⅛ of the length of orthogonal code of the first type of reference signal. After the base station informs the user the length of orthogonal code of the second type of reference signal, the user can calculate the orthogonal code sequence of the second type of reference signal according to the orthogonal code index of the first type of reference signal and the length of orthogonal code of the second type of reference signal.

For example, the OCC length of the first type of reference signal of the user U0 is 8, the number of layers is 1, the OCC index is 1, and the corresponding sequence is a sequence Q1 with a length of 8; the base station uses a semi-static signaling or a dynamic signaling to notify the U0 that the OCC length of the second type of reference signal is 4. Then U0 can know the sequence used by the second type of reference signal according to the OCC index 1 of the first type of reference signal and the OCC length 4 of the second type of reference signal. For example, the sequence used by the second type of reference signal is a subsequence of Q1.

A subsequence of a sequence may be a sequence corresponding to the first half of the sequence values of the sequence, or a sequence corresponding to the second half of the sequence values of the sequence. For example, the subsequence of the sequence Q4 shown in Table 6 may be [1 1 −1 −1] or [−1 −1 1 1].

TABLE 6

The sequence Q4

1
1
−1
−1
−1
−1
1
1

The orthogonal sequence of the second type of reference signal is a subsequence of the orthogonal sequence of the first type of reference signal. The length of the orthogonal sequences of the second type of reference signal is shorter than the length of the orthogonal sequences of the first type of reference signal.

As shown in Tables 7, 1, 2, and 3, the base station only needs to notify an OCC index common to the first type of reference signal and the second type of reference signal, and the user can know the sequence value of the first type of reference signal and the sequence value of the second type of reference signal according to the common OCC index, even if the lengths of orthogonal codes of the two types of reference signals are different. The length of orthogonal code of the second type of reference signal can be notified by the base station to the user using another signaling.

That is to say, the orthogonal sequence index of the first type of reference signal determines an orthogonal sequence of the second type of reference signal, or in other words, the base station jointly notifies the sequence of the first type of reference signal and the sequence of the second type of reference signal. In this example, if the length of the orthogonal sequence of the second type of reference signal is shorter than the length of the orthogonal sequence of the first type of reference signal, the orthogonal sequence of the second type of reference signal is a subsequence of the orthogonal sequence of the first type of reference signal. As shown in Table 7, if the base station notifies that the orthogonal sequence of the first type of reference signal is Q1, a single port is used, and the sequence length of the second type of reference signal is equal to 4, and then the user can know the orthogonal sequence of the second type of reference signal is G1, since G1 is a subsequence of Q1. If the sequence length of the second type of reference signal is 2, and then P1 is the orthogonal sequence of the second type of reference signal, since P1 is a subsequence of Q1.

TABLE 7

Rank 1 for one user

| The first type of reference signal OCC = 8 | The first type of reference signal OCC = 8 | The second type of reference signal OCC = 4 | The second type of reference signal OCC = 2 |
|---|---|---|---|
| Q1 | Q1 | G1 | P1 |
| Q2 | Q2 | | |
| Q3 | Q3 | G2 | |
| Q4 | Q4 | | |
| Q5 | Q5 | G3 | P2 |
| Q6 | Q6 | | |
| Q7 | Q7 | G4 | |
| Q8 | Q8 | | |
| | Occupy 8 REs | Occupy 4 REs | Occupy 2 REs |

Of course, if multiple ports of the first type of reference signal correspond to one port of the second type of reference signal, then the orthogonal sequence used by this port of the second type of reference signal may be a subsequence of a sequence corresponding to a certain one of the multiple ports of the first type of reference signal. If the sequences assigned to the two ports of the first type of reference signal are Q1 and Q5, the sequences used for the port of the second type of reference signal may be a subsequence of Q1 or Q5.

The subsequences corresponding to the multiple ports of the first type of reference signal are the same.

If the first type of reference signal uses 2 layers (corresponding to 2 ports), for example the OCC length is equal to 8, and if the base station notifies the user that the length of orthogonal code of the second type of reference signal is also equal to 8 or the number of ports is also 2, then the user can know the OCC sequence used by the second type of reference signal is the same as the first type of reference signal, as shown in the second column of Table 8. If the base station notifies the user that the number of ports of the second type of reference signal is one or that the length of orthogonal code is half that of the first type of reference signal, then the user can know that the length of the orthogonal code sequence of the second type of reference signal is equal to 4, and one port of the second type of reference signal corresponds to two respective ports of the first type of reference signal. That is, the estimation result of the second type of reference signal may be used for the two ports of the second type of reference signal. In this example, the orthogonal code sequence used for the second type of reference signal can be known from the orthogonal code sequence used for the first type of reference signal.

In such a case, the subsequences corresponding to the multiple ports of the first type of reference signal are the same. As shown in Table 8, the sequence candidates assigned to the multiple ports of the first type of reference signal may be {Q1 Q2}, {Q3 Q4}, {Q5 Q6}, and {Q7 Q8}, and the subsequences of two sequences in each candidate are equal.

For example, in Table 8, if the first type of reference signal are configured with Q1 and Q2 and the subsequences of Q1 and Q2 are both equal to G1, the sequence used for the second type of reference signal is G1 when the length of the sequence of the second type of reference signal is equal to 4. However, if the length of the sequence of the second type of reference signal is equal to 2, the sequence used for the second type of reference signal is P1 since 2-length subsequences of Q1 and Q2 are all equal to P1.

When the length of a subsequence is half the length of a sequence S, the subsequence of S can be regarded as a sequence corresponding to the first half or the second half of S. When the length of a subsequence is one quarter of the sequence S, the subsequence of S can be regarded as the sequence corresponding to the first quarter of S.

TABLE 8

Rank 2 for one user

| the first type of reference signal OCC = 8 | a second type of reference signal OCC = 8 | a second type of reference signal OCC = 4 | the first type of reference signal OCC = 2 |
|---|---|---|---|
| Q1 Q2 | Q1 Q2 | G1 | P1 |
| Q3 Q4 | Q3 Q4 | G2 | |
| Q5 Q6 | Q5 Q6 | G3 | P2 |
| Q7 Q8 | Q7 Q8 | G4 | |
| | Occupies 8 REs | Occupies 4 REs | |

It is to be noted that the orthogonal sequence of the first type of reference signal determines the orthogonal sequence of the second type of reference signal, and the sequence types of the first type of reference signal and the second type of reference signal are not necessarily the same. For example, the first type of reference signal use a ZC sequence, and the second type of reference signal use a PN sequence. In the ZC sequence, the base station utilizes different cyclic shifts to orthogonally multiplex multiple reference signal ports, similar to the uplink DMRS in LTE, and therefore the base station can also use the CS (cyclic shift) indication of the first type of reference signal to implicitly indicate the OCC sequence of the second type of reference signal.

In the above example, the base station may notify the length of the orthogonal sequences of the second type of reference signal by using a high layer signaling or a dynamic signaling. That is to say, the first communication node notifies the second communication node of the length of the orthogonal sequence used by the second type of reference signal. In combination with a length of the orthogonal sequences of the second type of reference signal as well as the orthogonal sequences of the first type of reference signal, the user can know the sequence of the second type of reference signal.

The multiple ports of the first type of reference signal use multiple orthogonal sequences and the same scrambling sequence or pseudo-random sequence, and the multiple orthogonal ports of the second type of reference signal use the same orthogonal sequence and different scrambling sequences or pseudo-random sequences.

Also taking Table 8 as an example, if the first type of reference signal use 2 layers (corresponding to 2 ports), for example, the OCC length is equal to 8, if the number of ports of the second type of reference signal are also 2, and if the length of orthogonal code thereof is half that of the first type of reference signal, the user can then know that: the length of the orthogonal code sequence of the second type of reference signal is equal to 4, the orthogonal code sequence used for the second type of reference signal is a subsequence of the orthogonal code used for the first type of reference signal, the orthogonal sequences used by the two ports of the second type of reference signal are the same, and only the scrambling sequences are different.

For example, in Table 8, if the first type of reference signal are configured with Q1 and Q2, all the subsequences of Q1 and Q2 are equal to G1, and if the length of the sequence of the second type of reference signal is equal to 4, then all the sequences used by the two ports of the second type of reference signal are G1. In this example, the two ports of the second type of reference signal are no longer orthogonal due to using the same orthogonal code sequence G1. In order to distinguish the signals of the two ports, the two ports can use different pseudo-random sequences, for example, distinguished by different nSCIDs, similar to the LTE where different nSCIDs are used by the downlink demodulation reference signal ports 7, 8.

EXAMPLE 10

The orthogonal sequence of the first type of reference signal determines the orthogonal sequence of the second type of reference signal.

The first communication node informs the second communication node of the length of the orthogonal sequence used by the second type of reference signal by a signaling.

The base station indicates an index of the second type of reference signal by indicating an index of the first type of reference signal sequence, even though the lengths of the first type of reference signal and of the second type of reference signal are different. For the second type of reference signal, the base station only needs to additionally notify the length of the orthogonal sequence. The user can use the notification of the sequence of the first type of reference signal and the sequence length of the second type of reference signal to know the sequence used by the second type of reference signal, the port used by the second type of reference signal, the number of ports, and the relationship between the first type of reference signal and the second type of reference signal.

Figure 20:
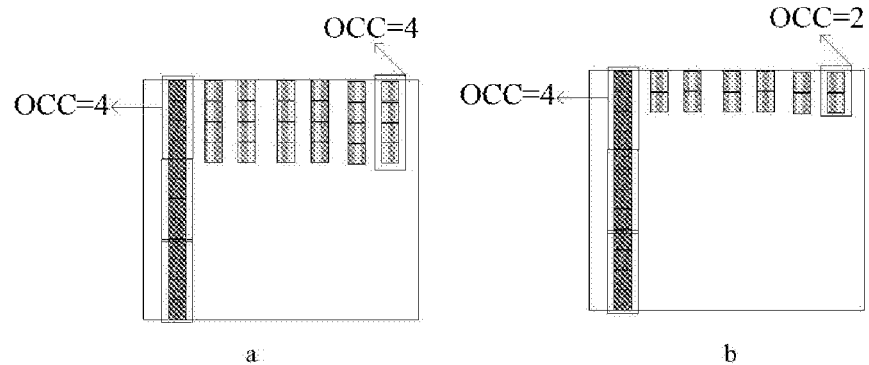
FIG. 20 is a schematic diagram of a case in which the length of the orthogonal sequences of the first type of reference signal is 4, and the length of the orthogonal sequences of the second type of reference signal is 4 or 2 according to Example 10 of the present disclosure.

FIG. 20 is a schematic diagram showing a case in which the length of the orthogonal sequence of the first type of reference signal is 4 and the length of the orthogonal sequence of the second type of reference signal is 4 or 2 according to Example 10 of the present disclosure. As shown in FIG. 20, if the length of the orthogonal sequence of the first type of reference signal is equal to 4, the 4 values of the orthogonal sequence are transmitted on 4 REs. If the base station informs the user that the length of the orthogonal sequence of the second type of reference signal is also equal to 4, as shown in 'a' of FIG. 20, where the orthogonal sequence of the second type of reference signal may be the same as the orthogonal sequence of the first type of reference signal. Table 9 lists cases in which the number of transmission ports of a user's first type of reference signal is 2, such as the assigned orthogonal sequence is G1 G2, as shown in the first column of Table 9. If the length of the orthogonal sequence of the second type of reference signal is equal to 4, the user can then infer that the number of ports of the second type of reference signal are equal to that of the first type of reference signal, and the sequence thereof is also G1 G2.

TABLE 9

| Rank 2 for one user | | |
| --- | --- | --- |
| The first type of reference signal OCC = 4 | The second type of reference signal OCC = 4 | The second type of reference signal OCC = 2 |
| G1 G2 G3 G4 4 REs | G1 G2 G3 G4 4 REs | P1 P2 2 REs |

If base station notifies the user that the length of the orthogonal sequences of the second type of reference signal are less than 4, for example, equal to 2, as shown in 'b' of FIG. 20, the user can know the sequence of the second type of reference signal and the number of ports according to the sequence of the first type of reference signal and the length of the orthogonal sequences of the second type of reference signal. As shown in the third column of Table 9, if the length of the orthogonal sequences of the second type of reference signal is 2, it can be known that the sequence is P1, i.e., the first two sequence values of the sequence corresponding to G1 (or G2). Moreover, the user can know the ratio of the number of ports of the second type of reference signal to that of the first type of reference signal according to the sequence length of the second type of sequence.

It is to be noted that the first type of reference signal and the second type of reference signal are not necessarily of the same type of sequence. For example, the first type of reference signal uses a ZC sequence, and the second type of reference signal use a PN sequence. As shown in LTE technical specification TS 36.211, the base station may generally notify the user of the cyclic shift of the first type of reference signal by a signaling to indicate the cyclic shift used when the ZC sequence is generated. The user can infer the orthogonal sequence of the second type of reference signal according to the cyclic shift indication of the first type of reference signal indicated by the base station. In other words, even if the first type of reference signal and the second type of reference signal are not the same type of reference signal, the base station can jointly notify the orthogonal sequence of the two types of reference signals, for example using the same index to indicate the cyclic shift of the first type of reference signal and the OCC orthogonal sequence of the second type of reference signal.

EXAMPLE 11

The first communication node jointly notifies information on time-domain orthogonal sequences of the first type of reference signal and a specific characteristic of the second type of reference signal.

The specific characteristic of the second type of reference signal includes one or more of the following: whether the second type of reference signal are zero power or non-zero power, whether the second type of reference signal are transmitted or not, and the density of the second type of reference signal in the time-domain.

Because the second type of reference signal are mainly used to compensate for phase noise and Doppler shift, there may be a phase difference among different time-domain symbols if there is an influence of phase noise, which will cause a large channel phase difference in different time-domain symbols even on the same subcarrier and in the same time slot. Therefore, when the base station wants to transmit the second type of reference signal, there is often phase noise, or the Doppler shift is serious, and thus the channels in different time-domain symbols are not very similar, which will affect the application of the time-domain orthogonal sequences. So, the base station will not configure the time-domain orthogonal sequences to the first type of reference signal in this example. Conversely, when the base station configures the time-domain orthogonal sequences of the first type of reference signal, there is often no transmission of the second type of reference signal. That is to say, only when there is no influence of phase noise, the application of the time-domain orthogonal sequences of the first type of reference signal is configured. In summary, if the orthogonal sequences of the first type of reference signal are applied, then there is no transmission of the second type of reference signal. Whereas if the second type of reference signal are transmitted, then the time-domain orthogonal sequences of the first type of reference signal are not applied.

Therefore, the base station can implicitly indicate whether the second type of reference signal are zero power or non-zero power, whether to transmit the second type of reference signal or not, or the density of the second type of reference signal in the time-domain, by a signaling indicating the time-domain orthogonal length of the first type of reference signal.

Figure 21:
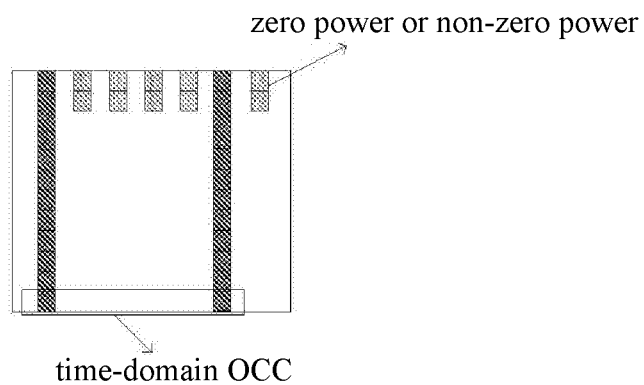
FIG. 21 is a schematic diagram of a case in which the length of orthogonal code on two columns of time-domain symbols of a first type of reference signal indicate characteristics of a second type of reference signal according to Example 11 of the present disclosure.

FIG. 21 is a schematic diagram showing a case in which a characteristic of a second type of reference signal is indicated according to a length of orthogonal codes on two columns of time-domain symbols of a first type of reference signal according to Example 11 of the present disclosure. As shown in FIG. 21, the base station indicates whether the second type of reference signal are zero power or non-zero power by a signaling indicating the user of the length of orthogonal code on the two columns of time-domain symbols of the first type of reference signal.

If the base station indicates the user that the length of orthogonal code on the time-domain of the two columns of the first type of reference signal is equal to 2, which means that the time-domain channels of the two columns of reference signals are similar, then the second type of reference signal are not required to be transmitted for estimation of the influence of Doppler shift and phase noise. In such a case, other users may transmit the second type of reference signal again at the position of the second type of reference signal, so the instant user can understand that nothing (no data transmission) occurs at the position of the second type of reference signal. That is the so-called the second type of reference signal with zero power. In this example, when demodulating the downlink data, the user knows that there is no data at the position corresponding to the second type of reference signal. In uplink, the user does not transmit the data at the corresponding locations, either.

Alternatively, the base station may indicate the user the density of the second type of reference signal by a signaling indicating a length of orthogonal codes on the two columns of time-domain symbols of the first type of reference signal. If the base station indicates the user that the length of orthogonal codes on the two columns of the time-domain symbols of the first type of reference signal is relatively large, it means that the change of the time-domain channel is relatively gentle, and the time-domain density of the second type of reference signal can be lower. Whereas, if the base station indicates that the length of orthogonal code in the time-domain symbols of the first type of reference signal is relatively small, for example, equals to 1 (the orthogonal code is not used in the time-domain), it indicates that the time-domain channel changes relatively fast, and the density of the second type of reference signal can be higher.

Alternatively, the base station may indicate the user whether the second type of reference signal are transmitted or not by a signaling indicating a length of orthogonal codes on the two columns of time-domain symbols of the first type of reference signal. If the base station indicates the user that the length of orthogonal code on the two columns of the time-domain of the first type of reference signal is relatively large, it means that the change of the time-domain channel is relatively gentle, the second type of reference signal are not needed, and it is considered that the second type of reference signal are not transmitted, or have zero power.

That is to say, the signaling for indicating, by the base station, the time-domain orthogonal code of the first type of reference signal may also be used to indicate some parameter information of the second type of reference signal. Or whether the information on the time-domain orthogonal code of the first type of reference signal, and whether the second type of reference signal are transmitted or not, or it has a zero power or a non-zero power, or density information thereon can be indicated by a common signaling.

EXAMPLE 12

The second communication node notifies the first communication node of the indication information about the association between the first type of reference signal and the second type of reference signal.

That is to say, the first communication node may determine the association between the second type of reference signal and the first type of reference signal according to the information fed back from the second communication node.

The second communication node may feed the number of crystal oscillators of the second communication node back to the first communication node. For example, if the second communication node has only one crystal oscillators, for the transmission of uplink data, all ports of the first type of reference signal correspond to only one of the second type of reference signal.

Alternatively, the second communication node feeds the number of ports of the second type of reference signal back to the first communication node, and thus the first communication node can configure the number of ports of the second type of reference signal and the association between the first type of reference signal and the second type of reference signal according to the information fed back from the second communication node. For example, if the number of the ports of the second type of reference signal fed by the second communication node back to the first communication node is 2, the base station may pre-define or configure the second communication node by a signaling that the number of the ports of the second type of reference signal is 1 or 2 and it is obviously not necessary to configure the number of the ports to be larger than 2. If the number of ports of the second type of reference signal, which is predefined or configured by a signaling for the second communication node, is 2, and if the number of ports of the first type of reference signal are multiple, then the ports of the first type of reference signal may be divided into two groups in a pre-defined manner or a signaling manner. The two groups respectively correspond to two ports of the second type of reference signal. Whereas if the first type of reference signal have one port, the number of ports of the second type of reference signal may also be one, corresponding to the one port of the first type of reference signal since, in general, the number of ports of the first type of reference signal are greater or equal to the number of ports of the second type of reference signal.

The second communication node may notify the first communication node of the maximum number of ports of the second type of reference signal when reporting the user capability.

The base station can semi-statically configure the user with the maximum number of ports of the second type of reference signal. According to the number of ports of the first type of reference signal, the user can know the actual number of ports of the second type of reference signal and its association with the first type of reference signal. For example, if the maximum number of ports of the second type of reference signal configured to the user by the base station is 2, it is notified that the first type of reference signal use 8 ports, the user can know that the first four of the 8 ports correspond to port 1 of the second type of reference signal, and the second four thereof for the first type of reference signal correspond to port 2 of the second type of reference signal. If the number of ports of the first type of reference signal is 1, then the number of ports of the second type of reference signal is also 1, which corresponds to the number of ports of the first type of reference signal.

As shown in Table 10, if the first type of reference signal and the second type of reference signal have a predefined association, the base station only needs to notify the number of ports of the first type of reference signal and the second type of reference signal, and then the user can obtain the association between the two types of reference signals. Of course, the user can feed the number of ports of the second type of reference signal back to the base station.

TABLE 10

| The value of L2 | The port numbers of the second type of reference signal | The value of L1 | The port numbers of the first type of reference signal | The association between the port numbers of the first type of reference signal and the second type of reference signal |
|---|---|---|---|---|
| 1 | N1 | 1 | M1 | N1 corresponds to M1 |
| 1 | N1 | 2 | M1 M2 | N1 corresponds to {M1, M2} |
| 1 | N1 | 4 | M1 M2 M3 M4 | N1 corresponds to {M1 M2 M3 M4} |
| 1 | N1 | 8 | M1 M2 M3 M4 M5 M6 M7 M8 | N1 corresponds to {M1 M2 M3 M4 M5 M6 M7 M8} |
| 2 | N1, N2, | 2 | M1 M2 | N1 corresponds to M1<br>N2 corresponds to M2 |
| 2 | N1, N2, | 4 | M1 M2 M3 M4 | N1 corresponds to {M1, M2}<br>N2 corresponds to {M3, M4} |
| 2 | N1, N2, | 8 | M1 M2 M3 M4 M5 M6 M7 M8 | N1 corresponds to {M1, M2, M3, M4}<br>N2 corresponds to {M5, M6, M7, M8} |
| 4 | N1, N2, N3, N4 | 4 | M1 M2 M3 M4 | N1 corresponds to M1<br>N2 corresponds to M2<br>N3 corresponds to M3<br>N4 corresponds to M4 |
| 4 | N1, N2, N3, N4 | 8 | M1 M2 M3 M4 M5 M6 M7 M8 | N1 corresponds to {M1, M2}<br>N2 corresponds to {M3, M4}<br>N3 corresponds to {M5, M6}<br>N4 corresponds to {M7, M8} |
| 8 | N1, N2, N3, N4, N5, N6, N7, N8 | 8 | M1 M2 M3 M4 M5 M6 M7 M8 | N1 corresponds to M1<br>N2 corresponds to M2<br>N3 corresponds to M3<br>N4 corresponds to M4<br>N5 corresponds to M5<br>N6 corresponds to M6 |

TABLE 10-continued

| The value of L2 | The port numbers of the second type of reference signal | The value of L1 | The port numbers of the first type of reference signal | The association between the port numbers of the first type of reference signal and the second type of reference signal |
|---|---|---|---|---|
| | | | | N7 corresponds to M7<br>N8 corresponds to M8 |

It is assumed, in Table 10, that the maximum number of ports of the first type of reference signal is 8, the 8 ports are M1, M2, M3, M4, M5, M6, M7, and M8 respectively, and the second type of reference signal also has the maximum number of ports of 8, i.e., including N1, N2, N3, N4, N5, N6, N7, and N8 respectively.

The second communication node may also feed the port association between the first type of reference signal and the second type of reference signal back to the second communication node. The user feeds back to the base station a mapping relationship between L1 ports of the first type of reference signal and L2 ports of the second type of reference signal. If the association between the first type of reference signal and the second type of reference signal is not fixed but flexible, the user may need to feed the association between the two types of reference signals back to the base station. For example, when L1=L2=2, the user will feed back whether M1 corresponds to N1 and M2 corresponds to N2, or whether M2 corresponds to N1, M1 corresponds to N2.

EXAMPLE 13

A part of the ports of the first type of reference signal or of the second type of reference signal are pseudo-orthogonal.

For the same user, the ports of the first type of reference signal and/or the second type of reference signal can be divided into two groups, the ports between the groups are pseudo-orthogonal, and the ports inside the same group are orthogonal. Of course, one group can contain only one port. The definition of pseudo-orthogonal is similar to LTE, which means that different ports are distinguished by using different scrambling sequences or pseudo-random sequences, such as different nSCIDs.

The user informs the base station whether it has ability of demodulating pseudo-orthogonal when reporting the capability, or informs the base station of the receiver capability, such as whether it is a successive interference cancellation (SIC) receiver. The base station can determine, according to the reporting of receiver capability of the UE, that different ports of the user can be configured to be pseudo-orthogonal. For example, if the receiver capability reported in the user capability is poor, then the multiple ports configured by the base station for the user must be orthogonal. However, if the receiver capability reported in the user capability is good, the base station may select to configure the multiple ports of the reference signal of the user as being orthogonal or pseudo-orthogonal.

EXAMPLE 14

Because the second type of reference signal are mainly to compensate for the channel deviation caused by phase noise and the influence of phase noise is only serious in the high frequency bands, especially in the high-order modulation, the second type of reference signal may not be transmitted or not configured. That is to say, the base station may not configure the transmission of the second type of reference signal.

It will be apparent to those skilled person in the art that the various modules or operations of the present disclosure described above can be implemented by a general-purpose computing device, which can be centralized on a single computing device or distributed across a network containing multiple computing devices. Alternatively, the various modules or operations of the present disclosure described above may be implemented by program codes executable by the computing device. Therefore, the program codes may be stored in the storage device for execution by the computing device. In some cases, the operations shown or described can be performed in an order which differs from the order described, or they be embodied separately by individual integrated circuit modules, or multiple modules or operations thereof are embodied in a single integrated circuit module. Thus, the present disclosure is not limited to any specific combination of hardware and software.

The above description only relates to preferred embodiments of the present disclosure, and is not intended to limit the present disclosure. For those skilled person in the art, various modifications and changes can be made to the present disclosure. Any modifications, equivalent substitutions, improvements, etc., made within the spirit and scope of the present disclosure, are intended to be included within the scope of the present disclosure.

INDUSTRIAL APPLICABILITY

The technical solution of the embodiment of the present disclosure determines the parameter of the second type of reference signal by using the parameter of the first type of reference signal, and the parameter of the first type of reference signal is obtained only by a first signaling, whereby obtaining the parameter of the second type of reference signal. It is not necessary to use additional signaling to individually transmit the parameter of the second type of reference signal, thereby reducing the signaling overhead. Therefore, it is possible to solve the problem of the large signaling overhead required in obtaining the reference signal in the related art.

What is claimed is:

1. A method for wireless communication, comprising:
   determining, by a network apparatus, a first parameter associated with a demodulation reference signal;
   determining, by the network apparatus, according to the first parameter, a second parameter associated with a second reference signal; and
   selectively receiving or transmitting, based on the demodulation reference signal, the second reference signal according to the second parameter,
   wherein the second parameter is used by the network apparatus to generate a sequence of the second reference signal, and wherein the sequence of the second reference signal in a frequency-domain location is determined based on a sequence of the demodulation reference signal at the same frequency-domain location.

2. The method of claim 1, wherein the network apparatus is a terminal device, and the method comprising:
receiving, by the terminal device, a Radio Resource Control (RRC) message from a base station, the RRC message indicating a location of a transmission resource block for the second reference signal in a sub-band that comprises multiple transmission blocks.

3. The method of claim 1, wherein the network apparatus is a base station, and the method comprising:
transmitting, by the base station, a Radio Resource Control (RRC) message to a terminal, the RRC message indicating a location of a transmission resource block for the second reference signal in a sub-band that comprises multiple transmission blocks.

4. The method of claim 1, wherein the sequence of the second reference signal is a replicate of the sequence of the demodulation reference signal at the same frequency-domain location.

5. The method of claim 1, wherein the first parameter indicates a port number of the demodulation reference signal, and the second parameter indicates a transmission resource used by the second reference signal.

6. The method of claim 5, wherein the network apparatus is a terminal device, and the method further comprising:
receiving, by the terminal device, a Radio Resource Control (RRC) message from a base station, the RRC message including a third parameter associated with the second reference signal for determining the second parameter.

7. The method of claim 5, wherein the network apparatus is a base station, and the method further comprising:
transmitting, by the base station, a Radio Resource Control (RRC) message to a terminal, the RRC message including a third parameter associated with the second reference signal for determining the second parameter.

8. The method of claim 1, wherein the second reference signal is not received or transmitted in case a time domain orthogonal sequence of the demodulation reference signal is applied.

9. A method for wireless communication, comprising:
determining, by a network apparatus, a first parameter associated with a demodulation reference signal;
determining, by the network apparatus, according to the first parameter, a second parameter associated with a second reference signal; and
selectively receiving or transmitting, based on the demodulation reference signal, the second reference signal according to the second parameter,
wherein the second parameter indicates a number of ports of the second reference signal, and wherein the first parameter indicates L1 ports of the demodulation reference signal, the method further comprising:
determining L2 groups of ports based on the L1 ports, wherein each group of ports corresponds to a same port of the second reference signal, L1 and L2 each being a positive integer.

10. The method of claim 9, wherein the second parameter is used by the network apparatus to generate a sequence of the second reference signal.

11. The method of claim 10, wherein the network apparatus is a terminal device, and wherein the determining of the first parameter comprises:
receiving, by the terminal device, a Radio Resource Control message that includes the first parameter for generating a sequence of the demodulation reference signal.

12. The method of claim 10, wherein the network apparatus is a base station, and wherein the determining of the first parameter comprises:
transmitting, by the base station, a Radio Resource Control message that includes the first parameter for generating a sequence of the demodulation reference signal.

13. The method of claim 9, wherein the determining of the second parameter comprises:
determining a port association between the demodulation reference signal and the second reference signal; and
determining the second parameter based on the first parameter and the port association.

14. The method of claim 9, wherein the second reference signal is not received or transmitted in case a time domain orthogonal sequence of the demodulation reference signal is applied.

15. A wireless communication device, comprising:
a processor, and
a memory including executable instructions, the instruction upon execution by the processor causing the processor to:
determine a first parameter associated with a demodulation reference signal;
determine, according to the first parameter, a second parameter associated with a second reference signal; and
selectively receive or transmit, based on the demodulation reference signal, the second reference signal according to the second parameter, wherein the second parameter is used to generate a sequence of the second reference signal, and
wherein the sequence of the second reference signal in a frequency-domain location is determined based on a sequence of the demodulation reference signal at the same frequency-domain location.

16. The device of claim 15, wherein the instruction upon execution by the processor causing the processor to:
receive a Radio Resource Control (RRC) message from a base station, the RRC message indicating a location of a transmission resource block for the second reference signal in a sub-band that comprises multiple transmission blocks.

17. The device of claim 15, wherein the instruction upon execution by the processor causing the processor to:
transmit a Radio Resource Control (RRC) message to a terminal, the RRC message indicating a location of a transmission resource block for the second reference signal in a sub-band that comprises multiple transmission blocks.

18. The device of claim 15, wherein the sequence of the second reference signal is a replicate of the sequence of the demodulation reference signal at the same frequency-domain location.

19. The device of claim 15, wherein the first parameter indicates a port number of the demodulation reference signal, and the second parameter indicates a transmission resource used by the second reference signal.

20. The device of claim 19, wherein the instruction upon execution by the processor causing the processor to:
receive a Radio Resource Control (RRC) message from a base station, the RRC message including a third parameter associated with the second reference signal for determining the second parameter.

21. The device of claim 19, wherein the instruction upon execution by the processor causing the processor to:
transmit a Radio Resource Control (RRC) message to a terminal, the RRC message including a third parameter associated with the second reference signal for determining the second parameter.

22. The device of claim 15, wherein the second reference signal is not received or transmitted in case a time domain orthogonal sequence of the demodulation reference signal is applied.

23. A wireless communication device, comprising:
a processor, and
a memory including executable instructions, the instruction upon execution by the processor causing the processor to:
determine a first parameter associated with a demodulation reference signal;
determine, according to the first parameter, a second parameter associated with a second reference signal; and
selectively receive or transmit, based on the demodulation reference signal, the second reference signal according to the second parameter,
wherein the second parameter indicates a number of ports of the second reference signal, wherein the first parameter indicates L1 ports of the demodulation reference signal, and wherein the instruction upon execution by the processor causing the processor to:
determining L2 groups of ports based on the L1 ports, wherein each group of ports corresponds to a same port of the second reference signal, L1 and L2 being a positive integer.

24. The device of claim 23, wherein the second parameter is used to generate a sequence of the second reference signal.

25. The device of claim 24, wherein the instruction upon execution by the processor causing the processor to:
receive a Radio Resource Control message that includes the first parameter for generating a sequence of the demodulation reference signal.

26. The device of claim 24, wherein the instruction upon execution by the processor causing the processor to:
transmit a Radio Resource Control message that includes the first parameter for generating a sequence of the demodulation reference signal.

27. The device of claim 23, wherein the instruction upon execution by the processor causing the processor to:
determine a port association between the demodulation reference signal and the second reference signal; and
determine the second parameter based on the first parameter and the port association.

28. The device of claim 23, wherein the second reference signal is not received or transmitted in case a time domain orthogonal sequence of the demodulation reference signal is applied.

* * * * *

UNITED STATES PATENT AND TRADEMARK OFFICE
CERTIFICATE OF CORRECTION

| | |
|---|---|
| PATENT NO. | : 11,201,709 B2 |
| APPLICATION NO. | : 16/503508 |
| DATED | : December 14, 2021 |
| INVENTOR(S) | : Chuangxin Jiang et al. |

It is certified that error appears in the above-identified patent and that said Letters Patent is hereby corrected as shown below:

In the Claims

In Column 57, Claim 2, Line 12, delete "multiple transmission blocks." and insert --multiple transmission resource blocks.--, therefor.

In Column 57, Claim 3, Line 19, delete "multiple transmission blocks." and insert --multiple transmission resource blocks.--, therefor.

In Column 58, Claim 16, Lines 47-48, delete "multiple transmission blocks." and insert --multiple transmission resource blocks.--, therefor.

In Column 58, Claim 17, Lines 54-55, delete "multiple transmission blocks." and insert --multiple transmission resource blocks.--, therefor.

Signed and Sealed this
Eighth Day of October, 2024

Katherine Kelly Vidal
*Director of the United States Patent and Trademark Office*